United States Patent
Ishida et al.

(10) Patent No.: US 7,557,960 B2
(45) Date of Patent: Jul. 7, 2009

(54) IMAGE FORMING APPARATUS

(75) Inventors: Hideki Ishida, Osaka (JP); Chikara Ishihara, Osaka (JP); Shingo Yoshida, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 612 days.

(21) Appl. No.: 11/316,125

(22) Filed: Dec. 21, 2005

(65) Prior Publication Data

US 2006/0139694 A1    Jun. 29, 2006

(30) Foreign Application Priority Data

Dec. 27, 2004   (JP)   ............... 2004-375436
Dec. 27, 2004   (JP)   ............... 2004-375885
Dec. 27, 2004   (JP)   ............... 2004-377954

(51) Int. Cl.
   *H04N 1/40*   (2006.01)
(52) U.S. Cl. .............. 358/3.02; 358/3.09; 358/3.1; 358/3.11; 358/3.12; 345/589
(58) Field of Classification Search ............... 358/3.02, 358/3.26, 518, 521; 347/237, 251; 399/44–46, 399/50, 138, 176
   See application file for complete search history.

(56) References Cited

U.S. PATENT DOCUMENTS

| | | | | |
|---|---|---|---|---|
| 5,339,137 | A * | 8/1994 | Kusumoto et al. | 399/50 |
| 6,226,019 | B1 * | 5/2001 | Nakano | 347/131 |
| 6,917,770 | B2 * | 7/2005 | Bae et al. | 399/44 |
| 7,245,842 | B2 * | 7/2007 | Hino | 399/49 |

2002/0063936 A1   5/2002   Mituhashi

FOREIGN PATENT DOCUMENTS

| | | |
|---|---|---|
| JP | 1998-31332 | 2/1998 |
| JP | 198 18 088 | 4/1999 |
| JP | 2000-162834 | 6/2000 |
| JP | 2003-154706 | 5/2003 |
| JP | 2004-061860 | * 2/2004 |
| JP | 2004-61860 | 2/2004 |
| JP | 2004-233694 | 8/2004 |
| JP | 1998 18 088 | 5/2005 |

* cited by examiner

*Primary Examiner*—Mark K Zimmerman
*Assistant Examiner*—Dung D Tran
(74) *Attorney, Agent, or Firm*—Jordan and Hamburg LLP

(57) ABSTRACT

Uneven image density produced by photoreceptors, in which uneven electrification and sensitivity coexist, is limited economically and space efficiently. For each segment of the surface of the photoreceptor, individual memorizing of slope information K1 defining the slope of when a pixel gradation is approximately linear-transformed into exposure amount and, based upon K1 per segment, individual transforming of pixel gradation into the exposure amount (individual exposure amount transformation) is performed. The slope information which, with a reference electric potential Vs1, matches the electric potential after the exposure of when the exposure amount, obtained by transforming a reference pixel gradation Is1 by means of the individual exposure amount transformation, is applied to the approximately-linear exposure property excepting the converging region to a residual potential VL, or to the exposure property extended by extrapolation operation, among exposure property g01 showing correspondence between the exposure amount and the electric potential after exposure per segment.

13 Claims, 11 Drawing Sheets

Fig. 10

EXAMPLE OF PIXEL ARRAY BY TWO-VALUE ERROR DIFFUSION METHOD

| 15 | 0  | 0  | 0  | 15 | 0  | 15 | 15 | 0  | 15 |
|----|----|----|----|----|----|----|----|----|----|
| 0  | 0  | 15 | 0  | 15 | 0  | 0  | 0  | 0  | 0  |
| 0  | 15 | 0  | 0  | 0  | 15 | 15 | 0  | 15 | 0  |
| 15 | 15 | 0  | 15 | 0  | 0  | 0  | 15 | 0  | 15 |
| 0  | 0  | 15 | 0  | 0  | 15 | 15 | 0  | 0  | 0  |
| 15 | 0  | 0  | 15 | 15 | 0  | 0  | 0  | 15 | 15 |
| 15 | 0  | 15 | 0  | 0  | 0  | 15 | 15 | 15 | 0  |
| 0  | 0  | 0  | 15 | 0  | 15 | 0  | 15 | 0  | 15 |
| 0  | 15 | 0  | 0  | 15 | 15 | 0  | 0  | 0  | 0  |
| 15 | 0  | 0  | 15 | 0  | 0  | 15 | 0  | 15 | 0  |

| | |
|---|---|
| THE NUMBER OF ALL PIXELS | 100 PIXELS |
| THE NUMBER OF PIXELS WITH 0 GRADATION | 60 PIXELS |
| THE NUMBER OF PIXELS WITH 15 GRADATION | 40 PIXELS |
| AVERAGE | 6 GRADATION |

Fig. 11

EXAMPLE OF PIXEL ARRAY BY MULTI-LEVEL SCREEN IMAGE

| | |
|---|---|
| THE NUMBER OF DRAWING PIXELS | 40 PIXELS |
| THE NUMBER OF PIXELS WITH 7 GRADATION | 10 PIXELS |
| THE NUMBER OF PIXELS WITH 15 GRADATION | 30 PIXELS |
| AVERAGE | 13 GRADATION |

IMAGE FORMING APPARATUS

BACKGROUND OF THE INVENTION

1. Field of the Invention

The present invention relates to an electrophotographic image forming apparatus, and especially relates to an image forming apparatus, which appropriately adjust the excess and deficiency of electric potential after exposure caused by uneven electrification and uneven sensitivity on the surface of photoreceptor.

2. Description of the Related Art

An electrophotographic image forming apparatus (such as a copier, printer, facsimile, and the like) writes an electrostatic latent image by having the surface of photoreceptor (generally, drum-shaped photoreceptor) uniformly electrified to a prescribed initial electric potential by an electrification apparatus (electrification means), and by exposing the aforesaid electrified photoreceptor's surface by exposure means (such as the means for scanning laser source and its beam, and LED array).

When an image formation is conducted, firstly, the value indicating the shading level of each pixel (hereinafter referred to as "pixel gradation") is determined based upon the image data of a target image formation by a prescribed image processing means, such that the surface of photoreceptor electrified by the electrification apparatus is exposed by exposing means according to the exposure amount obtained by transforming (normally, linear transformation) the aforesaid pixel gradation determined by the image processing means based upon the prescribed transformation data into the exposure amount.

Incidentally, each photoreceptor has a peculiar electric potential distribution, even if the surface of photoreceptor is uniformly electrified under a fixed condition by the electrification apparatus, since each photoreceptor has individual differences caused by unevenness of such as the film thickness and material property in its surface member. Also, due to a distribution in the electrification amount of the electrification device itself, there occurs a distribution in the electrification amount of the photoreceptor occurring in a longitudinal direction of the electrification device. This is so-called "uneven electrification".

Even if each region having the same initial electric potential is exposed with the same exposure amount, the electric potential does not necessarily decrease to the same value, causing unevenness. In other words, this is the situation where occurs a distribution (unevenness) in the ratio of differences in the electric potential decrease to the exposure amount (in other words, a slope of a graph showing relationship between the exposure amount and the electric potential after exposure), and this is so-called "uneven sensitivity". Furthermore, there also occurs an electric potential distribution in the photoreceptor, due to uneven exposure as a phenomenon wherein the exposure amount by the exposing means becomes uneven in the width direction of the photoreceptor. For example, uneven exposure (the electric potential difference) is likely to occur between the center and around the both edges in the width direction of the photoreceptor, due to optical property of the exposing means.

Thus, in regard to these respective regions of the surface of photoreceptors which have individually different uneven electrification and sensitivity, if the pixel gradation is transformed into the exposure amount based upon the same (common) transformation information (can be called "transformation factor"), even if each region is exposed with the same exposure amount, the electric potential after exposure differs in each region, thereby causing uneven development (uneven density) since the density developed with toner (development density) has the excess and deficiency against the proper density.

In general, in case of the apparatus which conducts gradation representation by the area coverage modulation method representing the image shading with arrays of the pixel gradation of multiple pixels (so-called "digital machine"), although minute uneven sensitivity and uneven electrification less appear as uneven density compared to the apparatus which represents image shading with only shading per pixel (so-called "analog machine"), the digital machine conducting gradation representation by area coverage modulation method is also unable to completely avoid uneven density when there exists large uneven electrification.

Especially, although the color image forming apparatus superimposing four color toner images of CMYK (Cyan, Magenta, Yellow and Black) forms a color-mixed gray image by superimposing 3 color toner images of CMY, an uniform color-mixed gray image can not be formed (uneven density occurs) when uneven electrification appears on the surface of photoreceptor after exposure, losing the balance in CMY.

For example, according to Japanese Patent Publication Number 2003-154706, it has been considered that uneven density prominently appears when the electric potential after exposure has more than 5V of uneven electric potential. Such phenomenon appears more prominent in the so-called "tandem-style color image forming apparatus". Also, since uneven electrification of the a-Si photoreceptor (the photoreceptor comprising photosensitive layer made of amorphous silicon) is generally larger than that of OPC photoreceptor, the uneven density in images becomes more prominent. Even if the quality standard (acceptance level) for the a-Si photoreceptor is decided to have 5V or less uneven electrification, the yield significantly degrades, and that is not realistic.

Correspondingly, Japanese Patent Publication Number 2003-154706 discloses the skill that provides the auxiliary exposure means to correct distribution of the initial electric potential in the process of exposure for writing electrostatic latent image.

Also, the skill to correct the exposure amount based upon the information of the sensitivity of photoreceptor, the skill to correct the uneven sensitivity per rotational position of the photoreceptor, the skill to correct the uneven sensitivity per exposure position of photoreceptor, and the skill to correct uneven sensitivity according to the data of sensitivity distribution of photoreceptor, are disclosed respectively in Japanese Patent Publication Number 1998-31332, 2000-162834, 2004-61860 and 2004-233694.

SUMMARY OF THE INVENTION

However, as disclosed in Japanese Patent Publication Number 2003-154706, there still remains the problem that the establishment of an independent exposure means separated from an exposure means for writing electrostatic latent image is not applicable in most cases due to enlargement in size and increase in cost. The problem about space and cost becomes more prominent especially in tandem-style color image forming apparatus since the establishment of another exposure means is required for each of a plurality (normally four) of photoreceptor.

Also, the skills disclosed in the Japanese Patent Publication Number 1998-31332, 2000-162834, 2004-61860 and 2004-233694 are to correct uneven sensitivity of photoreceptors, in other words, to correct difference between the slop (ration of the difference of electric potential decrease to the difference of the exposure amount) in the standard exposure property of photoreceptors (relationship between the exposure amount and the amount of electric potential decrease), and the slop in the exposure property of photoreceptors of a controlled object, so that when there exists a distribution (uneven electrification) in the initial electric potential of the electrified photoreceptor before exposure, there still remains the problem that uneven density of an image can not be avoided since the distribution of the electric potential remains itself as offset.

FIG. 6 shows the relationship between the pixel gradation in the photoreceptors, in which uneven electrification and uneven sensitivity coexist, made of a-Si (amorphous silicon), and the electric potential of the photoreceptor exposed with the exposure amount corresponding to the pixel gradation (indicated in Figure by dot line). FIGS. 6(a) and 6(b) respectively shows the property in the case of not correcting the exposure amount (indicated by thick dotted line g01), and in the case of correcting uneven sensitivity of exposure amount (indicated by thick full line g02). Also, the property indicated in present figure by the thick full line (g0) shows the reference (standard) property of photoreceptor (hereinafter, referred to as "reference property").

Here, although the horizontal axis indicates the pixel gradation in the graph of FIG. 6(a), the horizontal axis can be equivalent to the exposure amount as long as the transformation of the pixel gradation to the exposure amount (the individual exposure amount transformation) is conducted based upon a certain converting formula (the coefficient is fixed) or a converting table. In other words, in FIG. 6(a), the graph lines g0 showing the standard property of photoreceptor and g01 showing the measured and controlled property of photoreceptor can be regarded as the exposure property (the property of electric potential after exposure against the exposure amount) by replacing the horizontal axis with the exposure amount, since they are either examples of the transformation of the pixel gradation into the exposure amount, having been conducted following the same converting formula (in other words, no correction).

As shown in FIG. 6(a), the exposure property indicating the correspondence between the exposure amount and the electric potential after exposure in the photoreceptor (especially, a-Si photoreceptor), in which the electric potential after exposure linearly decrease as the exposure amount increase, generally shows almost linear-shape exposure property except for the converging region (the region in which the slope of electric potential decrease against the exposure amount increase is very gentle) to residual potential (the electric potential which remains after maximum exposure). For example, in FIG. 6(a), while the exposure property g01 of the measured photoreceptor shows almost linear-shape exposure property in the range where the amount of electrification is less than or equal to 2 E when the pixel gradation is set I2, the exposure property g0 of the reference photoreceptor shows almost linear-shape exposure property in the range where the amount of electrification is less than and equal to Es2 when the pixel gradation is set Is2.

Also, as shown in FIG. 6(a), when the measured photoreceptor simultaneously has uneven electrification and uneven sensitivity, the difference (equivalent to uneven electrification) in initial electric potential (electrified electric potential before exposure, i.e. y segment) and the difference in slopes of exposure property (equivalent to uneven sensitivity) occur with the reference exposure property g0. When the correction of uneven sensitivity of exposure amount (correction to conform slops) is conducted to the aforesaid photoreceptor, as shown in FIG. 6(b), the electric potential difference corresponding to uneven electrification (difference in the initial electric potential) remains as a offset, thereby causing the uneven density.

Consequently, the image forming apparatus in this invention has been invented considering the foregoing conditions, and the object of this invention is to provide a image forming apparatus which can prevent as much as possible the occurrence of uneven image density produced by the photoreceptor in which the uneven electrification and the uneven sensitivity coexist, without enlargement of the apparatus as well as increase in the cost.

In order to achieve the foregoing purposes, this invention consists of any of constructions indicated below as the first invention, the second invention, and the third invention.

[The First Invention]

The first invention is applied to the image forming apparatus, which determines the pixel gradation indicating gray level per pixel by the image processing means based upon the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel's gradation determined by the image processing means by means of the exposure means (exposure means for writing electrostatic latent image). Furthermore, for each of the segments multi-divided in the surface of the photoreceptor, within a partial or whole range of the pixel gradation, the first invention individually memorizes the slope information, which defines the slope of when the pixel gradation is approximately linear-transformed into the exposure amount, into the memory means (memory means for individual slope information), and then individually transform the pixel gradation into the exposure amount per segment based upon the slope information (hereinafter referred to as "individual exposure amount transformation").

Here, the slope information is an information which, with a reference electric potential that is common between all of the segments, approximately matches the electric potential after exposure of when the exposure amount, obtained by transforming a reference pixel gradation that is common between all of the segments by means of the individual exposure amount transformation, is applied, to the property (approximately-linear exposure property) excepting the converging region (the region in which the slope showing electric potential decrease against the exposure amount increase becomes very gentle) to the residual potential (electric potential which remains after the exposure at the maximum exposure amount), or to the exposure property extending the approximately-linear exposure property of above approximately linear exposure property by extrapolation operation, among the exposure properties showing correspondences between the exposure amount and the electric potential after exposure per segment.

For example, when the reference electric potential stays within the range of the approximately-linear exposure property, the slope information is the information for approximately matching the electric potential after exposure, of when the segments is exposed with the exposure amount obtained by transforming the reference pixel gradation by the individual exposure amount transformation, with the reference electric potential.

When the transformation from the pixel gradation into the exposure amount is conducted according to the slope information, the photoreceptor in which the uneven electrification and the uneven sensitivity coexist (the electrified photoreceptor), has the property such that the property of the electric potential of the exposed photoreceptor against the pixel gradation has an intersecting point (the point determined by the reference pixel gradation and the reference electric potential) with a reference (standard) property per segment. Consequently, the individual exposure amount transformation is conducted as intended to achieve a property more similar to the reference property, thereby preventing as much as possible the occurrence of the uneven density in images. Furthermore, without additional exposing means and the like, the above transformation can be realized by exposure amount control by the existing exposure means for writing electrostatic latent image (the control of the transformation from the pixel gradation into the exposure amount), thereby not causing enlargement of the apparatus as well as increase in the cost.

In regard to the slope information, for example, it is contemplated that, for the approximately-linear exposure property in respective segments, to employ the information for approximately matching the electric potential after exposure of when the exposure amount, obtained by transforming the reference pixel gradation as utilizing the individual exposure amount transformation, is applied, with the reference electric potential that is the electric potential at the approximately midpoint between the initial electric potential and the residual potential, and furthermore, for the approximately-linear exposure property in respective segments, to employ the information for approximately matching the electric potential after exposure of when the exposure amount, obtained by transforming the reference pixel gradation as utilizing the individual exposure amount transformation, is applied, with a minimum electric potential in the approximately-linear exposure property, or with the reference electric potential that is the electric potential close to the minimum electric potential.

Additionally, it is contemplated, for the exposure property extending the approximately-linear exposure property in respective segments by extrapolation operation, to employ the slope information for approximately matching the electric potential after exposure of when the exposure amount, obtained by transforming the reference pixel gradation that is maximum the pixel gradation or close to the maximum pixel gradation by means of the individual exposure amount transformation, is applied, with the reference electric potential.

The above properties as will hereinafter be described respectively.

Moreover, when the image processing based upon the image data is the processing that conducts the gradation representation by area coverage modulation method that determines arrangement of the pixel gradation in multiple pixel, the first invention as described above is suitable for being capable to prevent appearing the uneven density in an image, even though there exists large uneven electrification.

[The Second Invention]

The second invention is applied to the image forming apparatus, which determines the arrangement of the pixel gradation indicating gray level in each pixel per unit pixel group comprised of multiple pixels by area coverage modulation method (for instance, screen method and error diffusion method, and the like) based upon the prescribed image data, such as the reading image data from manuscript in coping machines, and the image data of printing job in printers, and further, writes the electrostatic latent image onto the photoreceptor by exposing the surface of photoreceptor previously electrified by the electrification means in accordance with the exposure amount obtained by transforming the pixel's gradation determined by the image processing means by means of the exposure means (exposure means for writing electrostatic latent image), and consequently the second invention conducts the individual exposure amount transformation similar to the first invention.

Here, the slope information is an information which, with a reference electric potential that is common between all of the segments, approximately matches the electric potential after the exposure of when the exposure amount, obtained by transforming a reference pixel gradation that is the approximate average value of the pixel gradations in a partial or whole of pixels in the unit pixel group determined based upon the prescribed one or multiple image data by the image processing means, by means of the individual exposure amount transformation, is applied, to the property (approximately-linear exposure property) excepting the converging region (the region in which the slope showing electric potential decrease against the exposure amount increase becomes very gentle) to the residual potential (electric potential which remains after the exposure at the maximum exposure amount), or to the exposure property extending the approximately-linear exposure property of above approximately linear exposure property by extrapolation operation, among the exposure properties showing the correspondence between the exposure amount and the electric potential after exposure per segment.

For example, when the reference electric potential stays within the range of the approximately-linear exposure property, the slope information is the information for approximately matching the electric potential after exposure, of when the segments is exposed with the exposure amount obtained by transforming the reference pixel gradation by the individual exposure amount transformation, with the reference electric potential.

When the transformation from the pixel gradation into the exposure amount is conducted according to the slope information, the photoreceptor in which the uneven electrification and the uneven sensitivity coexist (the electrified photoreceptor), has the property such that the property of the electric potential of the exposed photoreceptor against the pixel gradation has an intersecting point (the point determined by the reference pixel gradation and the reference electric potential) with a reference (standard) property per segment. Consequently, the individual exposure amount transformation is conducted as intended to achieve a property more similar to the reference property, thereby preventing as much as possible the occurrence of the uneven density in images. Especially, in the image processing by area coverage modulation method, it is suitable for being capable to prevent appearing the uneven density in an image, even though the uneven electrification having relatively large space period exist. Furthermore, without additional exposing means and the like, the above transformation can be realized by exposure amount control by the existing exposure means for writing electrostatic latent image (the control of the transformation from the pixel gradation into the exposure amount), thereby not causing enlargement of the apparatus as well as increase in the cost.

In addition, the reference pixel gradation which has approximately identical electric potential after exposure in all of the segments (approximately matches with the reference electric potential), is the approximate average value of the pixel gradations in a partial or whole pixels in the unit pixel group actually determined by the image processing means, thereby achieving the individual exposure amount transformation appropriate to the property of an actual output image (the average pixel gradation).

For example, when the average value of the pixel gradations in the unit pixel group, of when the image data of the density gradation in frequent use is processed by the image processing means, is set as the reference pixel gradation, uniformed electric potential after exposure effectively appears (in other words, the uneven density is effectively prevented) particularly in the image data of the density gradation in frequent use.

And also, even when the image processing by the image processing means (such as, pixel arrangement pattern in the area coverage modulation method and the screen method) differs on the conditions of the image processing modes of image forming apparatus (such as, character/graphic mode and photo mode), the slope information becomes appropriate to each condition.

Here, it is contemplated that the value to be employed as the reference pixel gradation includes the approximate average value of all but 0 level gradations in the unit pixel group determined by the image processing means based upon one or multiple prescribed image data (pixel gradation in a part of pixels).

Additionally in the this case, it is contemplated that the reference pixel gradation may include, among the pixel gradations in the unit pixel group determined by the image processing means, the reference pixel gradation of approximate average value of all but 0 level gradations in multiple of the unit pixel groups representing each density gradation in a part or whole range of all density gradations which can be represented by the area coverage modulation method employed by the image processing means.

Consequently, near the average of the pixel gradations of pixels that are actually pictured (printed) when forming an image (pixels having more than 0 level gradation), the individual exposure amount transformation is conducted so that the electric potential after exposure approaches further to (harmonized with) the reference electric potential, thereby effectively preventing uneven density as reflecting actual conditions.

In view of past achievements, if it is previously understood that the image formation of the image data corresponding to the density gradation in a partial range of all density gradations that can be represented in an area coverage modulation method is conducted more frequently, and if the reference pixel gradation is determined based upon such unit pixel group representing the density gradation in a partial range, effective prevention of uneven density may be achieved as reflecting actual conditions.

It is contemplated that, as the area coverage modulation method employed by the image processing means, the screen method, error diffusion method, or the method employing either of the methods are appropriate.

[Common Elements Between the First and the Second Inventions]

When the reference electric potential and the pixel gradation corresponding to thereof differ, the slope information utilized in the individual exposure amount transformation accordingly differ, however, the reference electric potential suitable for preventing uneven density of an image may differ according to each condition.

Here, it is contemplated that, according to each condition, a plurality of the slope information (in which the reference electric potential respectively correspond to each of different condition) is memorized per segment, then from which the slope information utilized for the individual exposure amount transformation is selected.

For example, based upon one or multiple of the following: the kind of area coverage modulation method employed by image processing (such as the kind of screen in the screen method), the toner color employed in development of electrostatic lament image, the pixel gradation to be determined based upon the target image data for image formation by image processing, the history of the pixel gradation determined by the image processing of past image formation performed by present image forming apparatus, and operating input via prescribed operating input means, the information utilized for the individual exposure amount transformation is selected from a plurality of the slope information per segment.

Consequently, prevention of uneven image density according to the situation can be achieved.

[The Third Invention]

The third invention is applied to the image forming apparatus, which determines the pixel gradation indicating gray level in each pixel by image processing means based upon the prescribed image data, such as the reading image data from manuscript in coping machines and the image data of printing job in printers, and further, writes the electrostatic latent image onto the photoreceptor by exposing the surface of photoreceptor previously electrified by the electrification means in accordance with the exposure amount obtained by transforming the pixel gradation determined by the image processing means by means of the exposure means (exposure means for writing electrostatic latent image). Furthermore, the image forming apparatus memorizes a plurality of candidates for individual transformation information employed in order to transform the pixel gradation into the exposure amount into the memory means (memory means for individual transformation information) per segment multi-divided the surface of the photoreceptor, and then, based upon conditions related to development except for the exposure amount by the exposure means (hereinafter referred to as other developing conditions) and environmental conditions, selects the applicable information from the multiple candidates for individual transformation information, after that, transforms the pixel gradation individually into the exposure amount per segment according to the selected individual transformation information (hereinafter referred to as "individual exposure amount transformation", as referred in the first and second inventions).

From the above, appropriate selection of the individual transformation information can be achieved according to the changes in developing as well as environmental conditions, thereby preventing the occurrence of uneven density in images. In addition, without additional new exposing means and the like, the prevention of uneven density in images can be realized by control of exposure amount (control of transformation from the pixel gradation into the exposure amount) by existing exposing means for writing electrostatic latent image, thereby not causing enlargement of the apparatus as well as increase in the cost.

It is contemplated that the other developing conditions may include one or multiple of the followings: DC component in developing bias potential, frequency of AC component in developing bias potential, peak-to-peak value of AC component in developing bias potential (so called VPP), toner density in two-component developer, stirring time of developer, and accumulated using time of developer.

Also, it is contemplated that the environmental conditions may include environmental temperature (atmosphere temperature) and environmental humidity (atmosphere humidity).

Here, the individual transformation information employs the information that defines the slope of when the pixel gradation is approximately linear-transformed into the exposure amount in a part or whole range of the pixel gradation per segment multi-divided the surface of the photoreceptor, and further, the information which, with a reference electric potential that is common between all of the segments, approximately matches the electric potential after the exposure of when the exposure amount, obtained by transforming a reference pixel gradation that is common between all of the segments by means of the individual exposure amount transformation, is applied, to the property (approximately-linear exposure property) excepting the converging region (the region in which the slope showing electric potential decrease against the exposure amount increase becomes very gentle) to the residual potential (electric potential which remains after the exposure at the maximum exposure amount), or to the exposure property extending the approximately-linear exposure property of above approximately linear exposure property by extrapolation operation, among the exposure properties showing the correspondence between the exposure amount and the electric potential after exposure per segment.

For example, when the reference electric potential stays within the range of the approximately-linear exposure property, the slope information is the information for approximately matching the electric potential after exposure, of when the segments is exposed with the exposure amount obtained by transforming the reference pixel gradation by the individual exposure amount transformation, with the reference electric potential.

When the transformation from the pixel gradation into the exposure amount is conducted according to the slope information, the photoreceptor in which the uneven electrification and the uneven sensitivity coexist (the electrified photoreceptor), has the property such that the property of the electric potential of the exposed photoreceptor after exposure against the pixel gradation has an intersecting point (the point determined by the reference pixel gradation and the reference electric potential) with a reference (standard) property per segment. Consequently, the individual exposure amount transformation is conducted as intended to achieve a property more similar to the reference property, thereby preventing as much as possible the occurrence of the uneven density in image.

[Common Elements Between the First, the Second, and the Third Inventions]

Also, the segments corresponds to the regions multi-dividing the surface of the dram-shaped photoreceptor in the axial direction, in the circumference direction (one-dimensional segmentation) or in the both directions (two-dimensional segmentation). For example, the surface of photoreceptor can be segmented by the width or height of one pixel, or by the width and height of a plurality of pixels.

Here, it is obvious that the exposure means needs to conduct an exposure as recognizing each position of the segments. In general, regarding the exposure positions in the axial direction (in other words, "the main scanning direction") on the surface of the photoreceptor, the exposure means (or its control means) recognizes (detects) the writing position at least on a per-pixel basis. On the other hand, regarding the absolute position in the circumference direction (in other words, "sub scanning direction"), since it is not directly necessary information for image formation, it is necessary to provide the means to detect a rotational position of the photoreceptor.

Also, this invention is preferred to an s-Si photoreceptor where uneven electrification often remarkably occurs.

According to the above description, the first and the second invention individually transform the pixel gradation into the exposure amount based upon slope information that defines the slope of when the pixel gradation determined by the image processing means is approximately linear-transformed into exposure amount per segments multi-divided in the surface of photoreceptor (individual exposure amount transformation), and therefore, in regard to the photoreceptor in which both uneven electrification and uneven sensitivity coexist (electrified photoreceptor), the electric potential property of the photoreceptor after exposure of the pixel gradation per segment is controlled to approach the reference property as a whole, thereby preventing as much as possible the occurrence of uneven density in an image. Furthermore, without additional exposing means and the like, the above transformation can be realized by exposure amount control by the existing exposure means for writing electrostatic latent image (the control of the transformation from the pixel gradation into the exposure amount), thereby not causing enlargement of the apparatus as well as increase in the cost.

Moreover, the first invention memorizes a plurality of the slope information according to respective conditions per segment (respectively corresponding to the cases when the reference electric potentials differ), and from which selects the appropriate information to be employed for the individual exposure amount transformation, such that the slope information corresponding to the conditions such as the reference electric potentials suitable for preventing the uneven density in images according to the conditions can be selected, thereby preventing uneven density in images as accommodating flexibly to the change of each conditions.

In addition to the above, according to the second invention, the reference pixel gradation in which electric potentials after exposure become approximately same in every segments (approximately matches with the reference electric potential) is the approximate average value of the pixel gradations in a part or whole of the unit pixel group actually determined by the image processing means, therefore uneven density in image data having various density gradation is effectively and broadly prevented. Particularly, among the pixel gradations in the unit pixel group determined by the image processing means, when the approximate average value of all of but 0 level gradations in a plurality of the unit pixel group representing each density gradations in a part or whole range of all density gradations possibly represented by the area coverage modulation method employed by the image processing means, is the reference pixel gradation, the individual exposure amount transformation is conducted such that the electric potential after exposure further approaches to (harmonizes with) the reference electric potential near the average of the pixel gradations of pixels that are actually pictured (printed) when forming an image (pixels having more than 0 level gradation), and therefore, uneven density is effectively prevented as reflecting the actual conditions.

Moreover, when a plurality of the slope information according to respective conditions per segment (respectively corresponding to the cases when the reference electric potentials differ) is memorized, the appropriate information to be employed for the individual exposure amount transformation is selected, such that the slope information corresponding to the conditions such as the reference electric potentials suitable for preventing the uneven density in images according to the conditions can be selected, thereby preventing uneven density in images as accommodating flexibly to the change of each conditions.

In addition to the above, according to the third invention, appropriate individual transformation information (individual transformation information) can be selected according to the changes in developing and environmental conditions from a plurality of individual transformation information candidates to be used for transforming the pixel gradation determined by the image processing means into exposure amount per segment multi-divided the surface of photoreceptor (individual exposure amount transformation), thereby preventing the occurrence of uneven density in images. Furthermore, without additional new exposing means and the like, the above transformation can be realized by exposure amount control by the existing exposure means for writing electrostatic latent image (the control of the transformation from the pixel gradation into the exposure amount), thereby not causing enlargement of the apparatus as well as increase in the cost.

Furthermore, by employing the slope information as the individual transformation information that defines the slope of when the pixel gradation determined by the image processing means is approximately linear-transformed into exposure amount, the photoreceptor, in which both uneven electrification and uneven sensitivity coexist, is adjusted to make sure that the electric potential property after exposure to the pixel gradation per segment thereof approaches to the property of reference on the whole, thereby preventing as much as possible the occurrence of uneven density in images.

BRIEF DESCRIPTION OF THE DRAWINGS

FIG. 10 shows the first example of the decision rule of the reference gradation according to image forming apparatus X;

FIG. 11 shows the second example of the decision rule of the reference gradation according to image forming apparatus X.

DETAILED DESCRIPTION OF THE PREFERRED EMBODIMENTS

Figure 1:
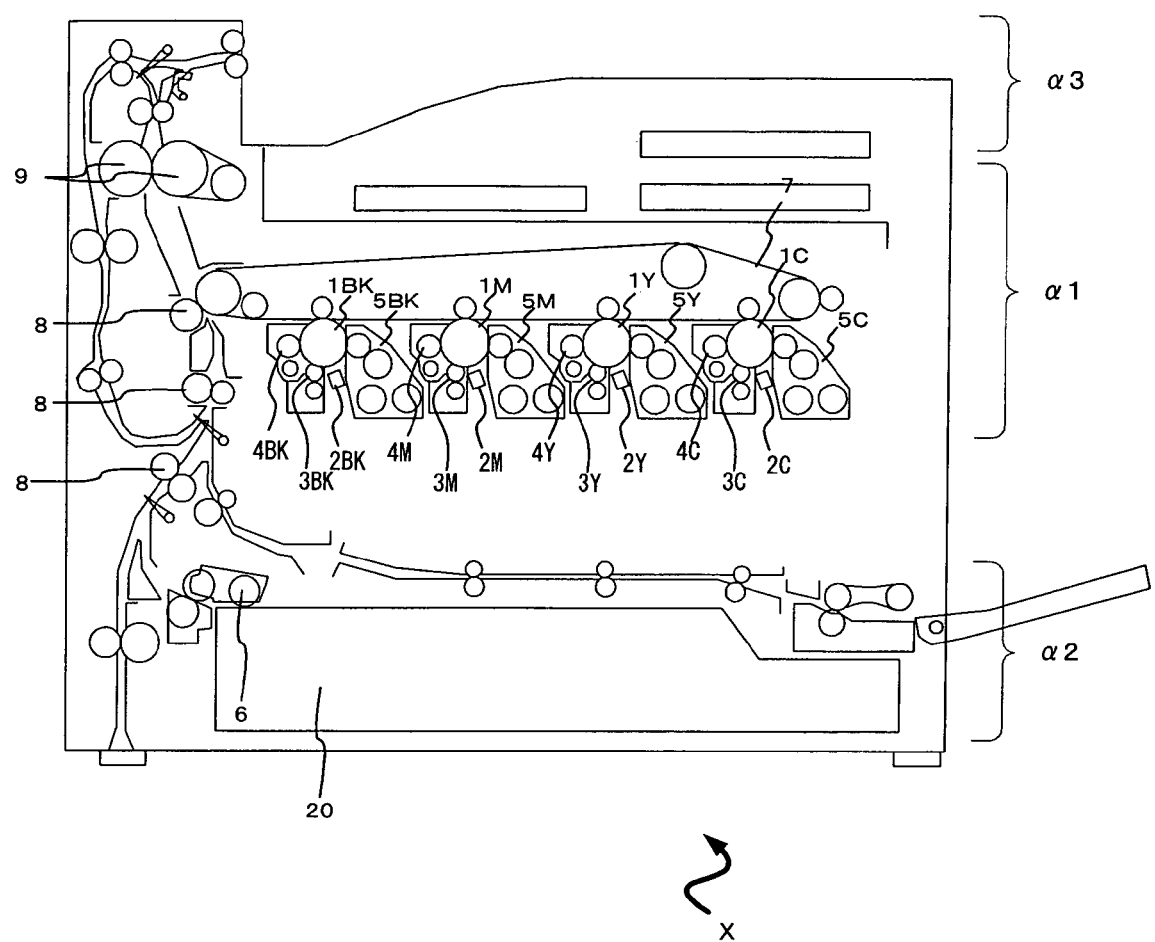
FIG. 1 is a schematic cross-sectional view showing an image forming apparatus X as one example of the application of the present invention.

With embodiments of the present invention described hereinafter with reference to the accompanying drawings, it is to be understood that the invention is not limited to those precise embodiments, and that various changes and modifications may be effected therein by one skilled in the art without departing from the scope or spirit of the invention as defined in the appended claims.

Referring now to an accompanying cross-sectional view in FIG. 1, the entire structure of an image forming apparatus X as one application of the present invention will be described.

Image forming apparatus X is a printer as an example of the image forming apparatus of the tandem system using four-color toner: black (BK), magenta (M), yellow (Y), and cyan (C).

Image forming apparatus X forms toner images and comprises an image forming unit $\alpha 1$ to form images on to the recording paper, a paper-feed unit $\alpha 2$ to feed the recording paper to the image forming unit $\alpha 1$, and a paper-eject unit $\alpha 3$ to eject the recording paper on which images are formed.

The image information (printer job) received by a communication member (not shown) from external apparatus such as personal computers is transformed into the pixel gradation as density information of each pixel to each of four colors, i.e. black (BK), magenta (M), yellow (Y) and cyan (C) by means of an image processing unit 12 described below.

Image forming unit $\alpha 1$ schematically comprises the followings:

Four photoreceptor drums 1 supporting images of each of four colors (1BK for black, 1M for magenta, 1Y for yellow and 1C for cyan);

Electrification apparatuses 3 (3BK, 3M, 3Y and 3C) uniformly electrifying each surface of photoreceptor drums 1;

Exposing sources 2 (2BK, 2M, 2Y, 2C as one example of exposure means) writing electrostatic latent images on to photoreceptor drums 1 by illuminating (exposing) each of the surface of photoreceptor drums 1 previously electrified by electrification apparatuses 3 with light equivalent to the exposure amount corresponding to the pixel gradation determined by after-mentioned image processing unit 12;

Developing apparatuses 5 (5BK, 5M, 5Y and 5C) developing toner images by feeding toner to the electrostatic latent image;

An intermediate transfer belt 7, on which toner images formed on the surface of photoreceptors are respectively transferred, then transferring the toner images onto a recording paper;

Carrier rollers 8 carrying a recording paper;

Fixing apparatuses 9 heat-fixing toner images transferred onto a recording paper;

Neutralizing apparatuses 4 neutralizing the surface of photoreceptor drums 1 which already transferred toner images onto such as a recording paper.

Photoreceptor drum 1 is, for example, such as a-Si photoreceptor that has high durability due to high hardness and stability of its property while relatively easily having uneven electrification as well as uneven sensitivity.

Although electrification apparatus 3 is for uniformly electrifying the surface of photoreceptor drum 1 along the axial direction, distribution occurs in the electric potential (the initial electric potential) after electrification (before exposure) by electrification apparatus 3 in case that photoreceptor drum 1 has uneven electrification.

Exposing source 2 shown in FIG. 1 indicates an example of exposing source that consists of LED array in which a plurality of LED is arrayed in each pixel in the axial direction (main scanning direction) of photoreceptors. Besides the above construction, exposing source 2 may also consist of such as a laser scanner scanning laser beam in the axial direction of photoreceptor drums 1.

Developing apparatus 5 comprises an developing roller which feeds toners to photoreceptor drums 1, such that the toner on the developing roller is pulled up to the surface of photoreceptor drums 1 according to electric potential gap between the electric potential impressed on the developing roller (developing bias potential) and that on the surface of photoreceptor drums 1, and thereby clearly visualizing an electrostatic latent image as a toner image.

Paper-feed unit α2 schematically comprises such as a paper-feed cassette 20 and a paper-feed roller 5. The recording paper previously held in paper-feed cassette 20 is carried to image forming unit α1 by the rotational-drive of paper-feed roller 5.

Developing apparatus 5 uses a two-component developer (the admixture of toners and carriers), and is equipped with a toner density sensor (normally, the permeability sensor) which, as an indicator, detects the toner density of the developer existing in a developer tank, such that the feeding timing of the toner from a toner storage tank connected to developing apparatus 5 into the developer tank of developing apparatus 5 can be controlled.

Paper-feed unit α2 schematically comprises such as paper-feed cassette 20 and paper-feed roller 5. The recording paper previously held in paper-feed cassette 20 is carried to image forming unit α1 by a rotational-drive of paper-feed roller 5.

The recording paper submitted from paper-feed-unit α2 is carried by carrier rollers 8, and at the same time, copied with a toner image on intermediate transfer belt 7. Then, the recording paper on which a toner image is copied is transferred to fixing apparatus 9, heat-fixed by such as heating roller, and transferred to ejecting unit α3 for ejection.

[The First Invention]

Hereinafter Described is the First Invention

Figure 2:
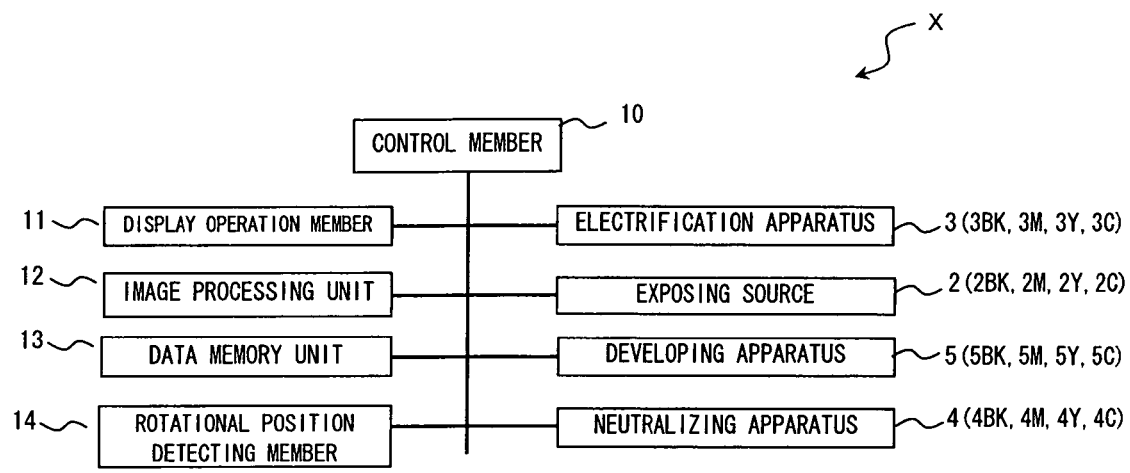
FIG. 2 is a block diagram showing the first example of a schematic structure of the main member of an image forming apparatus X.

FIG. 2 is a block diagram showing one example of the schematic construction of the main member of image forming apparatus X.

Image forming apparatus X comprises MPU and its peripheral apparatus such as ROM and RAM in addition to electrification apparatuses 3, exposing sources 2, developing apparatuses 5 and neutralizing apparatuses 4, and includes a control member 10 controlling each of components of image formation apparatus X, a display operation member 11 such as liquid-crystal-display touch panel used as an information display means for user as well as the means to input information according to the user's operation, an image processing unit 12 conducting the various image processing, a data memory unit 13 which can read and write such as EEPROM and memorize various data, and a rotational position detecting member 14 detecting the position of rotating direction of each of photoreceptor drums 1.

Image processing unit 12 executes the processing in which the pixel gradation indicating the gray level of each pixel for each toner color is determined in digital form based upon a prescribed image data (such as printing jobs) inputted from external apparatus via communication control member (not shown).

Here, image processing unit 12 represents a density gradation of images based upon the image data in the area coverage modulation methods such as error diffusion system and screen system determining the array of drawing pixels (printing pixels) and the pixel gradation of drawing pixels per unit of pixel group consisting of a plurality of pixels (hereinafter referred to as "unit pixel group").

Data memory unit 13 individually and previously memorizes a slope information defining the slope of when the pixel gradation is linear-transformed into an exposure amount predetermined in exposing source 2 per segment multi-dividing the surface of photoreceptor drums 1. The particulars thereof are hereinafter described.

The segments can be, for example, such as the region corresponding to each pixel {width of one pixel (in the axial direction)×height of one line (in the circumference direction) }, and the region corresponding to the unit pixel group employed for image processing in the area coverage modulation method in image processing unit 12.

Control member 10 obtains the pixel gradation determined by image processing unit 12, and individually transforms it into exposure amount per photoreceptor and segment based upon the slope information (one example of the means of exposure amount transformation). Hereinafter, this transformation is referred to as individual exposure amount transformation. The exposure amount obtained by the individual exposure amount transformation is set in respective exposing sources 2, such that the exposure to each of the photoreceptor according to the exposure amount set in each pixel is conducted by exposing source 2.

When adjustment of the transformation from pixel gradation into exposure amount is not performed, exposing source 2 normally adjusts lighting of a light using lighting time so that the exposure amount corresponds to the pixel gradation. In short, the lighting time for each of the light is adjusted so as to become proportional to a pixel gradation value with a current level supplied to the light held constant. In this regard, the proportional coefficient (the slope) in relationship between the pixel gradation and the lighting time is constant. However, the lighting time, which compensates the rising loss from the lighting start of the light is separately added.

In response to above, exposing source 2 in the present invention adjusts a level of current (A) supplied to the light according to an exposure amount (μJ/cm$^2$).

Additionally, the above adjustment may include adjusting the proportional coefficient so that the predetermined exposure amount is obtained with the proportional coefficient in correspondence between the pixel gradation and the lighting time (millisecond) for each pixel of the light held variable per segment, and with the current level supplied to the light held constant. Furthermore, combining the adjustment of the current level supplied to the light with the foregoing adjustment may also be included.

The above may apply to the case when a laser scanner is employed as exposing source 2.

Also, control part 10 controls the exposure of exposing source 2 as recognizing each position of the segments (exposure position).

In other words, when LED array is employed as exposing source 2, since LED is arrayed in each pixel, control member 10 recognizes an exposure position in the axial direction (main scanning direction) on the surface of photoreceptor drums 1 by the array position of the illuminating LED (such as array numbers).

On the other hand, regarding exposure positions in the circumference direction (sub scanning direction) on the surface of photoreceptor drums 1, a rotational position detecting member 14 detects which position on the surface of photoreceptor drums 1 is a light irradiation position of exposing source 2, and control member 10 recognizes the exposure position by obtaining the detected result.

At the same time, data memory unit 13 memorizes the combination of the identification information of LED (such as LED array numbers) and detection value of rotational position detecting member 14, and further memorizes the slope information corresponding to each of those combinations as the identification information of each of the segments.

Control member 10 also extracts (detects) and reads out the slope information employed for the individual exposure amount transformation from data memory unit 13 based upon the LED position (such as array numbers) to be illuminated and the result detected by rotational position detecting member 14.

Also, the construction of rotational position detecting member 14 may include the construction setting up the rotary potentiometer at the rotation axis of photoreceptor drum 1 so as to detect the rotational position, and the construction setting up a reference member such as protruding portion at the rotation axis of photoreceptor drum 1 so as to detect a passing position of the reference member by such as a contact-type switch and a photo coupler, thereby timing the elapsed time from the detecting time.

In case that a laser scanner is employed as exposing source 2, the exposure position in the axial direction (the main scanning direction) on the surface of photoreceptor drum 1 may be detected by, such as detecting the rotational position of the polygon mirror employed for the laser scanning, or timing the elapsed time from when the deflection of the laser beam to a prescribed basing-point position is detected by a light-receiving element.

In what follows, the slope information is described.

Image forming apparatus X is, in such as manufacturing phase, submitted to a property evaluation test for obtaining the exposure property of each of photoreceptor drums 1 built therein. More concretely, in the property evaluation test (pre-measurement), exposing source 2 exposes each of the segments on the surfaces of photoreceptor drum 1 electrified by electrification apparatus 3 on a plurality of the exposure amount conditions, while an the initial electric potential before exposure and the electric potential after exposure per segment are measured, so that the exposure property of each segment, in other words, the property representing relationship between the exposure amount and the electric potential after exposure (hereinafter referred to as "the measured exposure property") is revealed. A thick dashed graph g0 in FIG. 6(*a*) is an example of the exposure property revealed by the foregoing test.

Figure 6:
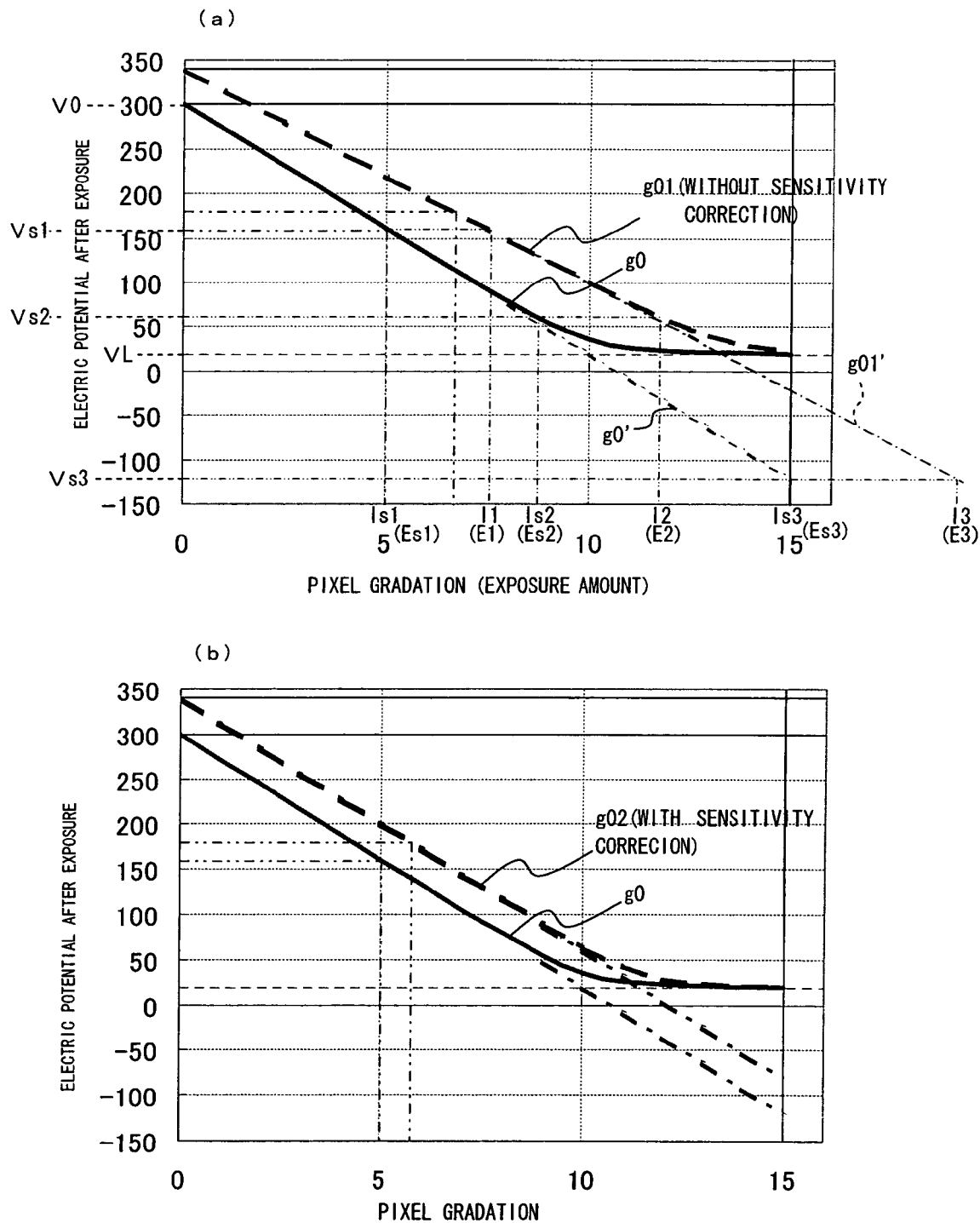
FIGS. 6(a) and 6(b) are graphs showing one example of the conventional relationship between the pixel gradation and the electric potential after exposure on the surface of the photoreceptor in which both uneven electrification and uneven sensitivity coexist.

As a method for measuring the exposure property of each of the segments, for example, a precise exposure property can be measured by exposing each of the segments as changing the exposure amount frequently and then measuring the electric potential after exposure. In addition, as shown in FIG. 6(*a*), since the exposure property has a certain tendency (curve shape) and can generally be formulated with the common formula by changing only its coefficient, the exposure property may be estimated based upon the electric potential exposed with one or more of the representative exposure amounts.

For example, since a-Si photoreceptor drum has constant residual potential regardless of positions on the surface of photoreceptor drums 1, the exposure property can be estimated in high accuracy by measuring the initial electric potential and the electric potential exposed with one exposure amount in the range of the approximately-linear property.

According to image forming apparatus X, the slope information is an information which, with reference electric potentials common between all of the segments (Vs1, Vs2 or Vs3, hereinafter referred to as "reference electric potential"), approximately matches the electric potential after exposure of when the exposure amount, obtained by transforming a reference pixel gradation common between all of the segments (Is1, Is2, or Is3, see FIG. 6(*a*)) by the individual exposure amount transformation, is applied to the approximately-linear exposure property excepting the converging region to the residual potential VL (the property of the range where the electric potential after exposure is Vs2 or more, as in the property of graph g01 in FIG. 6(*a*)), or to the exposure property that extended the aforesaid property by the extrapolation operation, among the exposure properties representing the correspondence between the exposure amount and the electric potential after exposure per segment.

Hereinafter, as referring to the above-mentioned FIG. 6 as well as FIG. 3 to FIG. 5, three embodiments wherein the values of the reference electric potential and the reference pixel gradation as the condition for specifying the slope information are different, will be described, as citing examples wherein certain segments on the surface of a-Si photoreceptor drums 1 have the exposure property indicated in FIG. 6(*a*), in other words, the exposure property wherein uneven electrification and uneven sensitivity coexist (g0).

The First Embodiment

Figure 3:
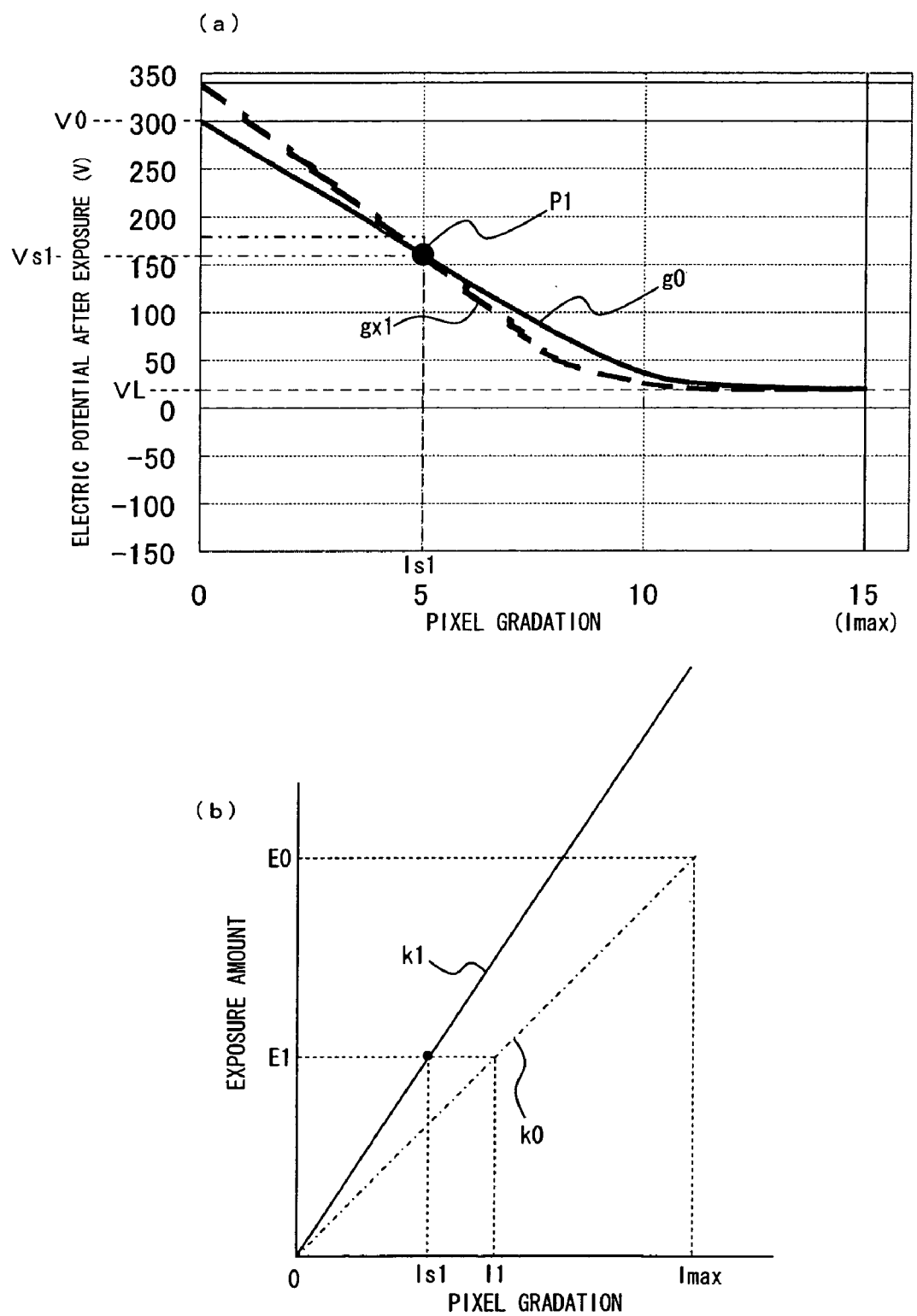
FIGS. 3(a) and 3(b) are graphs according to the first embodiment in image forming apparatus X, showing the transforming property from the pixel gradation into the exposure amount, as well as the relationship between the pixel gradation and the electric potential after exposure at that time.

FIG. 3(*b*) is a graph showing the property of the linear transformation from the pixel gradation into the exposure amount according to the first embodiment in relation to the segment having the exposure property indicated in the graph g01 in FIG. 6(*a*), and FIG. 3(*a*) is a graph showing the relationship between the pixel gradation of when the individual exposure amount transformation is conducted according to the property of FIG. 3(*b*) and the electric potential after exposure.

The linear transformation property indicated by dash-dotted line (E=k0·I, E: exposure amount, I: pixel gradation, K0: slop) in FIG. 3(*b*) represents the reference (standard) property of the individual exposure amount transformation, and the properties indicated by the graphs g0 and g01 in FIG. 6(*a*) are the properties of when the individual exposure amount transformation is conducted according to the reference transformation property (slope=k0). This also applies to FIG. 4(*b*) and FIG. 5(*b*) as described below.

The linear transformation property indicated by a full line (E=k1·I, E: exposure amount, I pixel gradation, K1: slope) in FIG. 3(*a*) represents the property of the individual exposure amount transformation according to the present first embodiment, of which a slope k1 is previously memorized in the data memory unit 13 as a slope information per segment.

In the first embodiment, the electric potential Vs1(=(V0+ VL)/2) at the midpoint between an initial electric potential V0 and a residual potential VL in the reference (ideal) exposure property (graph g0 in FIG. 6(a)) of the photoreceptor drum is determined as the reference electric potential. Furthermore, when an exposure is conducted with an exposure amount transformed by the individual exposure amount transformation of a pixel gradation, a pixel gradation Is1 is set as the reference pixel gradation. Here, pixel gradation Is1 is a pixel gradation of when it is contemplated as ideal that, when an exposure is conducted based upon it, the electric potential after the exposure matches with reference electric potential Vs1. In other words, the reference pixel gradation is set to pixel gradation Is1, which can be obtained by applying reference electric potential Vs1 to the reference property of the electric potential after exposure to the pixel gradation (graph g0 in FIG. 6(a)).

In other words, the reference electric potential Vs1 is the electric potential that corresponds to a so-called half-reduced exposure amount in the reference exposure property, moreover, approximately matches with the electric potential corresponding to the half-reduced exposure amount also in the exposure property in each segment of the photoreceptor drum 1 as a control target, though with a few fluctuations.

The slope information k1 is a information (slope k1 shown in FIG. 3(b)) for matching (or approximately matching under limitation such as resolution) the electric potential after exposure of when the exposure amount E1 obtained by transforming the reference pixel gradation Is1 by the individual exposure amount transformation is applied to the approximately-linear exposure property in each of the segment, with the reference electric potential Vs1 (the electric potential at the midpoint between an initial electric potential V0 and a residual potential VL).

In regard to the maximum exposure amount obtained by the individual exposure amount transformation of the maximum pixel gradation I max, the individual exposure amount transformation may be conducted so that the maximum exposure amount matches with the exposure amount calculated by multiplication of the half-reduced exposure amount with the constant that is common between all of the segments per segment. This is an example when the pixel gradation is linear-transformed into the exposure amount in a part of the pixel gradation range (the range excepting the maximum pixel gradation). Consequently, the setting of the maximum exposure amount according to the half-reduced exposure amount can be achieved.

When the segment is exposed based upon slope information k1 with the exposure amount obtained by linear-transformation (the individual exposure amount transformation) of the pixel gradation that is determined by image processing unit 12, the electric potential property after exposure to the pixel gradation appears as indicated in graph gx1 in FIG. 3(a).

As can be seen from the FIG. 3(a), in the segment in which uneven electrification and uneven sensitivity coexist, the property of the electric potential after exposure to the pixel gradation intersects with a reference (standard) property g0 at a P1 (the point specified by reference pixel gradation Is1 and reference electric potential Vs1). Thus, the individual exposure amount transformation is conducted such that, on the whole, its result approaches to a reference property g0, thereby preventing as much as possible the occurrence of uneven density in a image.

Figure 7:
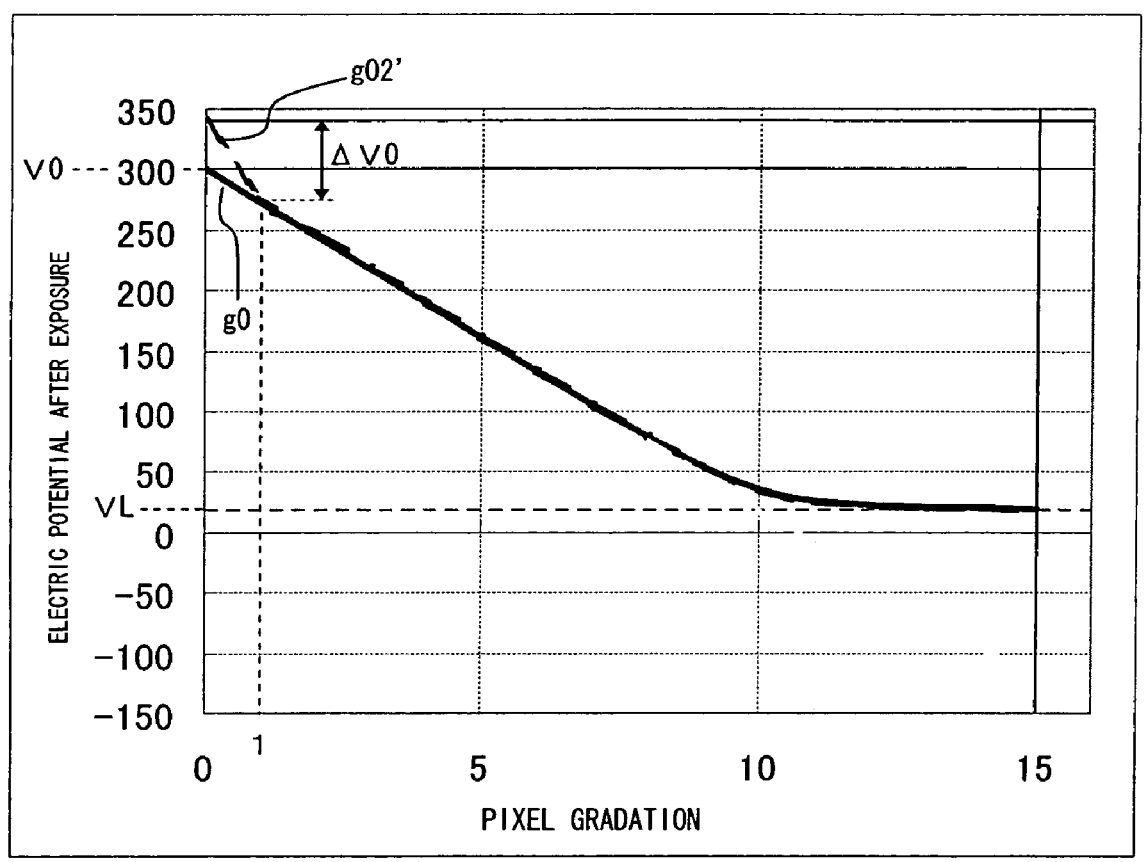
FIG. 7 is a graph of when exposing to the surface of the photoreceptor in which both uneven electrification and uneven sensitivity coexist, showing the relationship between the pixel gradation and the electric potential after exposure when the individual exposure amount transformation is conducted by setting all but zero pixel gradations respectively so that the electric potentials after exposure match with the reference property.

As indicated in a graph g02' in FIG. 7, it is contemplated that the individual exposure amount transformation is a transformation which matches electric potentials except the initial electric potential gap with reference property g0. In other words, the individual exposure amount transformation is a transformation which matches electric potential after exposure with reference property g0 when an exposure is conducted with all of the pixel gradations except 0 level gradation (a case not exposing) set respectively. However, when the individual exposure amount transformation resulting as shown in FIG. 7 is conducted, a gap ΔV0 between the initial electric potential before exposure and the electric potential after exposure with the pixel gradation set to 1 (minimum value excepting 0) becomes particularly large. When such gap ΔV0 is too large, the continuity of density of when representing an image at gray level is disturbed, thereby deteriorating image quality.

In response to the above, as shown in a graph gx1 in FIG. 3(a), when the linear-transformation from the pixel gradation into the exposure amount (the individual exposure amount transformation) is conducted so as to match with the reference property only at one point, gap ΔV0 neither becomes too large and deteriorates image quality by disturbing the continuity of gray level density. This applies also to the second, third and forth embodiments as below.

The Second Embodiment

FIG. 4(b) shows a graph indicating the property of the linear-transformation from the pixel gradation into the exposure amount (the individual exposure amount transformation) according to the second embodiment in regard to the segments having the exposure property shown in graph g01 in FIG. 6(a). FIG. 4(a) shows a graph representing a relationship between the pixel gradation of when the individual exposure amount transformation is conducted based upon the property indicated in FIG. 4(b), and the electric potential after exposure.

A linear-transformation property (E=k2·I), as indicated in full line in FIG. 4(a), represents the property of the individual exposure amount transformation according to the second embodiment, and a slope k2 therein is previously memorized in the data memory unit 13 as the slope information per segment.

In the second embodiment, the minimum electric potential Vs2 (or the one close to the minimum) in the part of the approximately-linear exposure property in the reference (ideal) exposure property (graph g0 in FIG. 6(a)) of the photoreceptor drum is determined as the reference electric potential. Furthermore, when an exposure is conducted with an exposure amount transformed by the individual exposure amount transformation of a pixel gradation, a pixel gradation Is2 is set as the reference pixel gradation. Here, pixel gradation Is2 is a pixel gradation of when it is contemplated as ideal that, when an exposure is conducted based upon it, the electric potential after the exposure matches with reference electric potential Vs2. In other words, the reference pixel gradation is set to pixel gradation Is2, which can be obtained by applying reference electric potential Vs2 to the reference property of the electric potential after exposure to the pixel gradation (graph g0 in FIG. 6(a)).

In other words, the reference electric potential Vs2 is the electric potential that just before reaches to the converging region to residual potential in the reference exposure property, moreover, just before reaches to the converging region to its residual potential also in the exposure property in each segment of the photoreceptor drum 1 as a control target, though with a few fluctuations.

The slope information k2 is a information (slope k2 shown in FIG. 4(b)) for matching (or approximately matching under limitation such as resolution) the electric potential after exposure of when the exposure amount E2 obtained by transforming the reference pixel gradation Is2 by the individual exposure amount transformation is applied to the approximately-linear exposure property in each of the segment, with the reference electric potential Vs2 (the electric potential of the minimum or close to the minimum in the approximately-linear exposure property).

When the segment is exposed based upon slope information k2 with the exposure amount obtained by linear-transformation (the individual exposure amount transformation) of the pixel gradation that is determined by image processing unit 12, the electric potential property after exposure to the pixel gradation appears as indicated in graph gx2 in FIG. 4(a).

As can be seen from the FIG. 4(a), in the segment in which uneven electrification and uneven sensitivity coexist, the property of the electric potential after exposure to the pixel gradation intersects with a reference (standard) property g0 at a P2 (the point specified by reference pixel gradation Is2 and reference electric potential Vs2). Thus, the individual exposure amount transformation is conducted such that, on the whole, its result approaches to a reference property g0, thereby preventing as much as possible the occurrence of uneven density in a image.

In the second embodiment, compared to the first embodiment, the accommodation amplitude toward matching with reference exposure property g0 becomes gentle, being suitable for the case when a photoreceptor drum 1 with large uneven electrification is used.

In other words, when the individual exposure amount transformation shown in the first embodiment is conducted with uneven electrification (the gap in initial electric potential between the segments) being large, the gradient (slope) indicating the change of electric potential after exposure against the change of the pixel gradation becomes large, and therefore, the image quality may be deteriorated because of disturbance of continuity of the density in the case when an image is represented in gray level. In response to the above, when the individual exposure amount transformation shown in the second embodiment is conducted, the gradient indicating the change of electric potential after exposure against the change of the pixel gradation is controlled, with the effect that the property of the electric potential after exposure to the pixel gradation approaches the reference property.

The Third Embodiment

FIG. 5(b) is a graph showing the property of the linear transformation from the pixel gradation into the exposure amount according to the third embodiment in relation to the segment having the exposure property indicated in the graph g01 in FIG. 6(a), and FIG. 5(a) is a graph showing the relationship between the pixel gradation of when the individual exposure amount transformation is conducted according to the property of FIG. 5(b) and the electric potential after exposure.

The linear transformation property indicated by a full line ($E=k3 \cdot I$) in FIG. 5(a) represents the property of the individual exposure amount transformation according to the present third embodiment, of which a slope k3 is previously memorized in the data memory unit 13 as a slope information per segment In the third embodiment, the maximum pixel gradation Is3 (15 in the example in FIG. 6(a)) or the pixel gradation close to it is determined as the reference pixel gradation. Furthermore, a prescribed exposure amount Es3 is obtained by transforming pixel gradation Is3 by the reference transformation formula ($E=k0 \cdot 1$), such that the reference electric potential is set to an electric potential after exposure Vs3 that can be obtained by applying an exposure amount Es3 to the property extending the approximately linear exposure property by extrapolation operation (an calculated imaginary property as indicated in dash line g0' in FIG. 6(a)). As described above, the approximately linear exposure property is a part of the reference (ideal) exposure property of the photoreceptor drum (graph g0 in FIG. 6(a)).

In addition, the slope information k3 is an information (slope k3 shown in FIG. 5(b)) for matching (or nearly matching under limitation such as resolution) the electric potential after exposure, of when the exposure amount E3 obtained by transforming the reference pixel gradation Is3 by the individual exposure amount transformation, is applied to the exposure property, in which the approximately-linear exposure property in each of the segment (the property within the range of the electric potential after exposure Vs2 or more as in the property of graph g01 in FIG. 6(a)) is extended by extrapolation operation (shown as g01' in FIG. 6(a)), with the reference electric potential Vs3 (the imaginary electric potential calculated by extrapolation operation).

With the above slope information k3, similar to the second embodiment, the gradient of the change in electric potential after exposure against the change in the pixel gradation can be controlled, with the effect that the electric potential property after exposure to the pixel gradation is brought close to the reference property.

As noted in the above, the optimal values of the reference electric potential and its corresponding pixel gradation may vary on the various conditions, therefore, so as the optimal slope information.

Here, it is contemplated that, according to various conditions, a plurality of slope information per segment (respectively corresponding to conditions in which the combinations between the reference electric potential and the reference pixel gradation respectively vary) is previously memorized in the data memory unit 13, and by means of the control member 10, the information to be used for the individual exposure amount transformation is selected among the multiple of slope information (one example of selecting means for slope information). The conditions used for this selection are as follows.

For example, when the kind of area coverage modulation method employed for image processing unit 12 (such as the kind of screen in the screen method) is automatically shifted in accordance with the contents of image data as the processing target, or shifted in accordance with the selecting operation prescribed by the display operation member 11 (such as selecting operation between "character/graphic mode" and "photo mode"), the slope information can be selected according to the kind of employed area coverage modulation method from a plurality of candidates.

Additionally, when a plurality of developing apparatuses for each of different toner color are established around one photoreceptor, the slope information can be selected, even in a same segment, in accordance with the toner color employed for developing electrostatic latent images to be written on the photoreceptor drum.

In the case of tandem-style color image forming apparatus, it is needless to say that, for each of combinations between the photoreceptor drums 1 and the exposing sources 2 corresponding each toner color, the slope information set based upon the conditions in which the combinations between the reference pixel gradation and the reference electric potential are different, can be determined.

In the individual exposure amount transformation based upon the slope information, the property of electric potential after exposure to the pixel gradation intersects at one point (such as P1) with the reference property (or the same extended by extrapolation operation), and therefore, the more the pixel gradation to be set is drew apart from the reference pixel gradation corresponding to the intersecting point, the more the property is drew apart from the reference property (the gap becomes large).

Here, it is contemplated that, by means of image processing unit 12, the slope information is selected from a plurality of candidates in accordance with the pixel gradation to be decided based upon the image data of the image forming target, or the history of the pixel gradation decided by image processing unit 12 in the image formation performed by the present image forming apparatus X in the past.

Thus, the slope information, reflecting the image data of image forming target as well as the history of actually performed image formation, is selected, thereby preventing the occurrence of uneven density in images according to conditions.

For example, it is contemplated that a plurality of the slope information calculated based upon a plurality of the reference pixel gradation is previously memorized in data memory unit 13 per segment. Then, when the pixel gradation for one page, for one line in the predetermined main scanning direction, or for a plurality of lines is determined by image processing unit 12 based upon the image data imputed as image forming target, the average value in drawing pixels thereof (a pixel in which pixel gradation is not 0) is calculated by control member 10. After that, the slope information based upon the reference pixel gradation being the closest to the average value is selected as a transformation information employed for the individual exposure amount transformation. It should be noticed that the aforementioned shifting of the slope information ought not to be performed halfway through the image formation for at least one page. It is for preventing occurrence of uneven density in images caused from changing the condition halfway through the image formation for one page.

It is also contemplated that, for example, a plurality of slope information calculated based upon a plurality of the reference pixel gradations is previously memorized in data memory unit 13, and at the same time, each time image formation is performed by image forming apparatus X, the average value of the pixel gradations determined by image processing unit 12 (for example, the average per page), as well as the average value of the pixel gradations of recently-prescribed page amount including the former average value, are memorized in data memory unit 13 as history information. Then, with a requirement for image formation arise, the slope information that is determined as based upon the reference pixel gradation closest to the average value of the pixel gradations for the recently-prescribed page amount, is selected as a transformation information employed for the individual exposure amount transformation.

In addition, the slope information can be selected in accordance with the prescribed selecting operation input via display operation member 11 (one example of operation inputting means).

In the above-mentioned embodiments and examples, image forming apparatus X wherein the slope information is previously memorized in data memory unit 13 is disclosed, however, an image forming apparatus including calculating means for the slope information may also be considered as an embodiment.

For example, an image forming apparatus, which is comprised to previously memorize the information related to exposure property for each of the segment of the photoreceptor drum 1 placed in image forming apparatus X, as well as the information related to reference exposure property common between all segments, in data memory unit 13, and based upon said memorized information, calculate the slope information (k1 to k3) as following the steps mentioned in each embodiment by established means, and then conduct the individual exposure amount transformation based upon the calculated slope information, can be included.

In short, in such as ROM provided with its control member 10, the image forming apparatus is comprised to previously store a program for calculating the slope information that approximately matches the electric potential after exposure, of when the exposure amount, obtained by transforming a reference pixel gradation common between all of the segments by the individual exposure amount transformation, is applied to the approximately-linear exposure property excepting the converging region to residual potential, or the exposure property extending the above approximately-linear exposure property by extrapolation operation, among the exposure property in each of the segments, with a reference electric potential common between all of the segments. With control member 10 performing the above program, the image forming apparatus is further comprised to perform calculation of the slope information, as well as the individual exposure amount transformation based upon its result. In this case, the information related to the exposure property for each of the segments can be regarded as the basic information including the slope information.

From the above, in manufacturing phase of the image forming apparatus, calculation of the slope information for respective apparatuses can be omitted.

[The Second Invention]

Hereinafter, the second invention is described.

Figure 8:
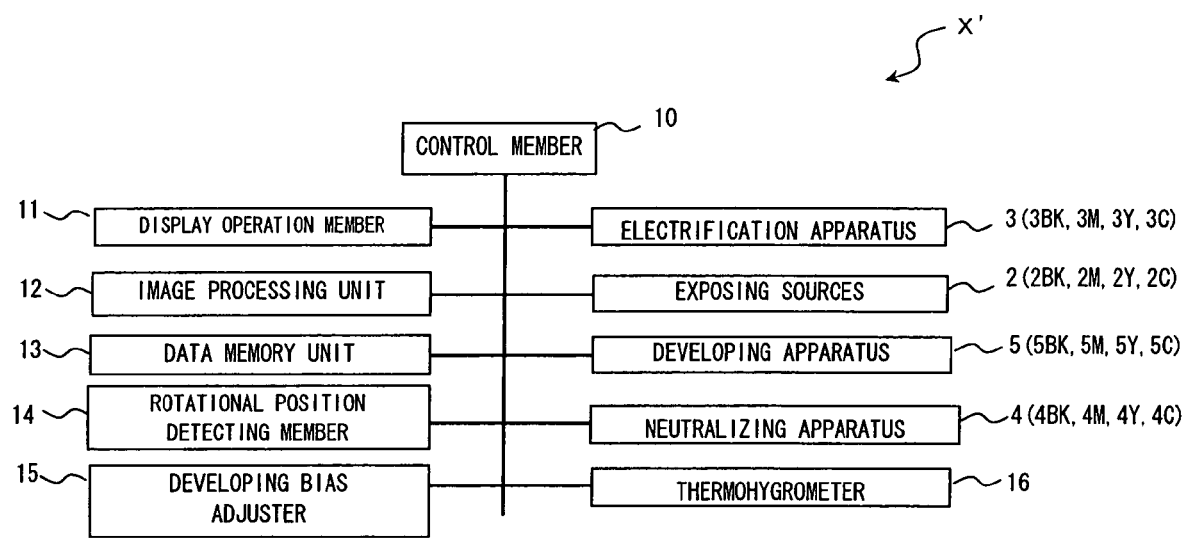
FIG. 8 is a block diagram showing the second example of a schematic structure of main member of image forming apparatus X.

FIG. 8 is a block diagram showing the second example of a schematic structure of main member of image forming apparatus X as an application target of the second invention.

In the second example, image forming apparatus X comprises a developing bias adjuster 15 and a thermohygrometer 16, in addition to the components indicated in FIG. 2 (electrification apparatuses 3, exposing sources 2, developing apparatuses 5, neutralizing apparatuses 4, control member 10, display operation member 11, image processing unit 12, data memory unit 13, rotational position detecting member 14). Developing bias adjuster 15 is for adjusting the level of DC component in developing bias potential of developing apparatus 5 as following a control order from control member 10, frequency of AC component, and VPP (peak-to-peak value), and the like.

Thermohygrometer 16 is a sensor for detecting temperature (atmosphere temperature) and humidity (atmosphere humidity) in setting environment of image forming apparatus X.

As mentioned above, in data memory unit 13, previously and individually memorized is a slope information (one example of individual transformation information) which defines the slope, of when the pixel gradation is linear-transformed into the exposure amount set in the exposing source 2, for each of the segments multi-divided the surface of the photoreceptor drums 1 (one example of memory means for individual transformation information).

Figure 4:
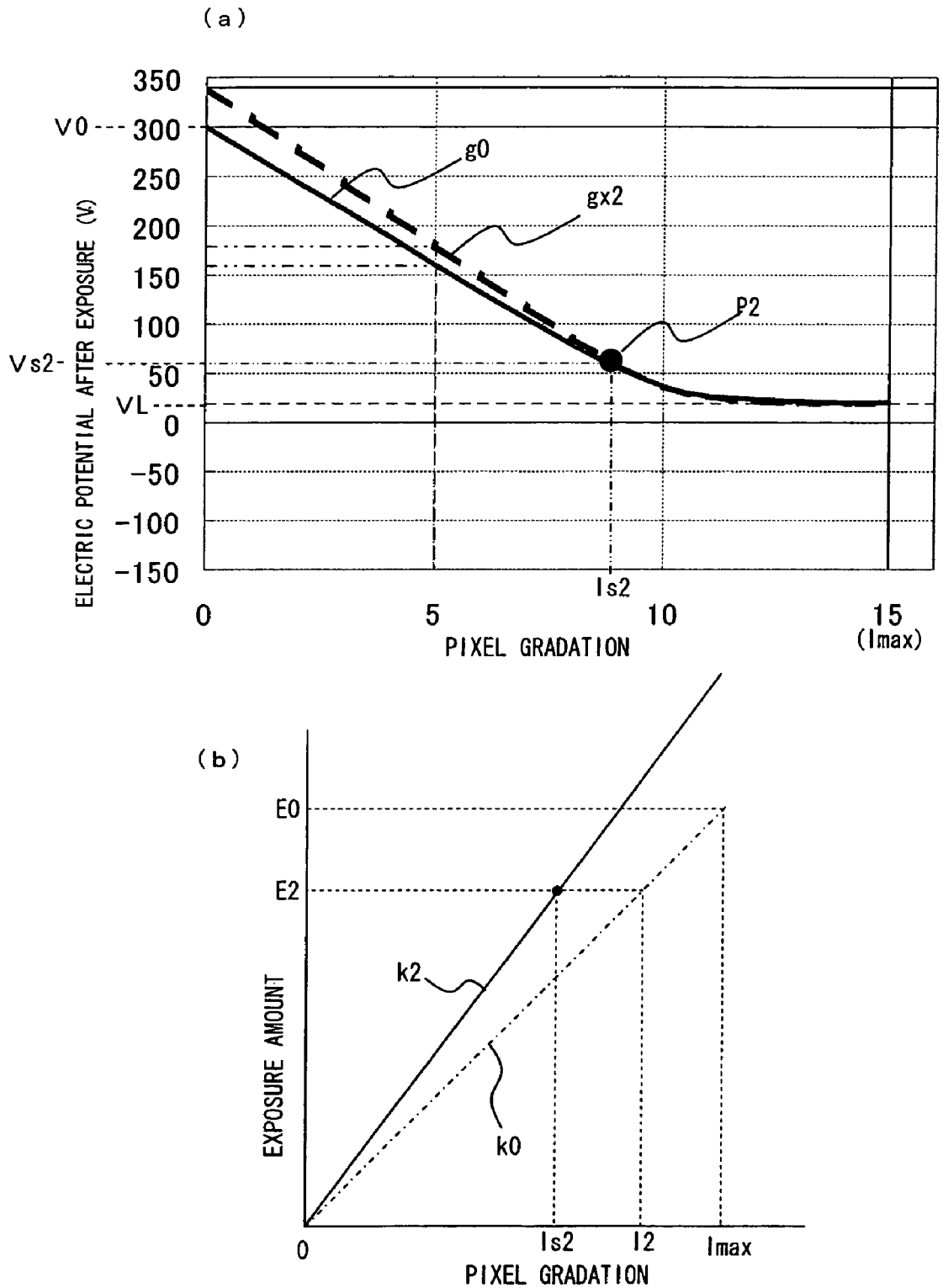
FIGS. 4(a) and 4(b) are graphs according to the second embodiment in image forming apparatus X, showing the transforming property from the pixel gradation into the exposure amount, as well as the relationship between the pixel gradation and the electric potential after exposure at that time.
Figure 5:
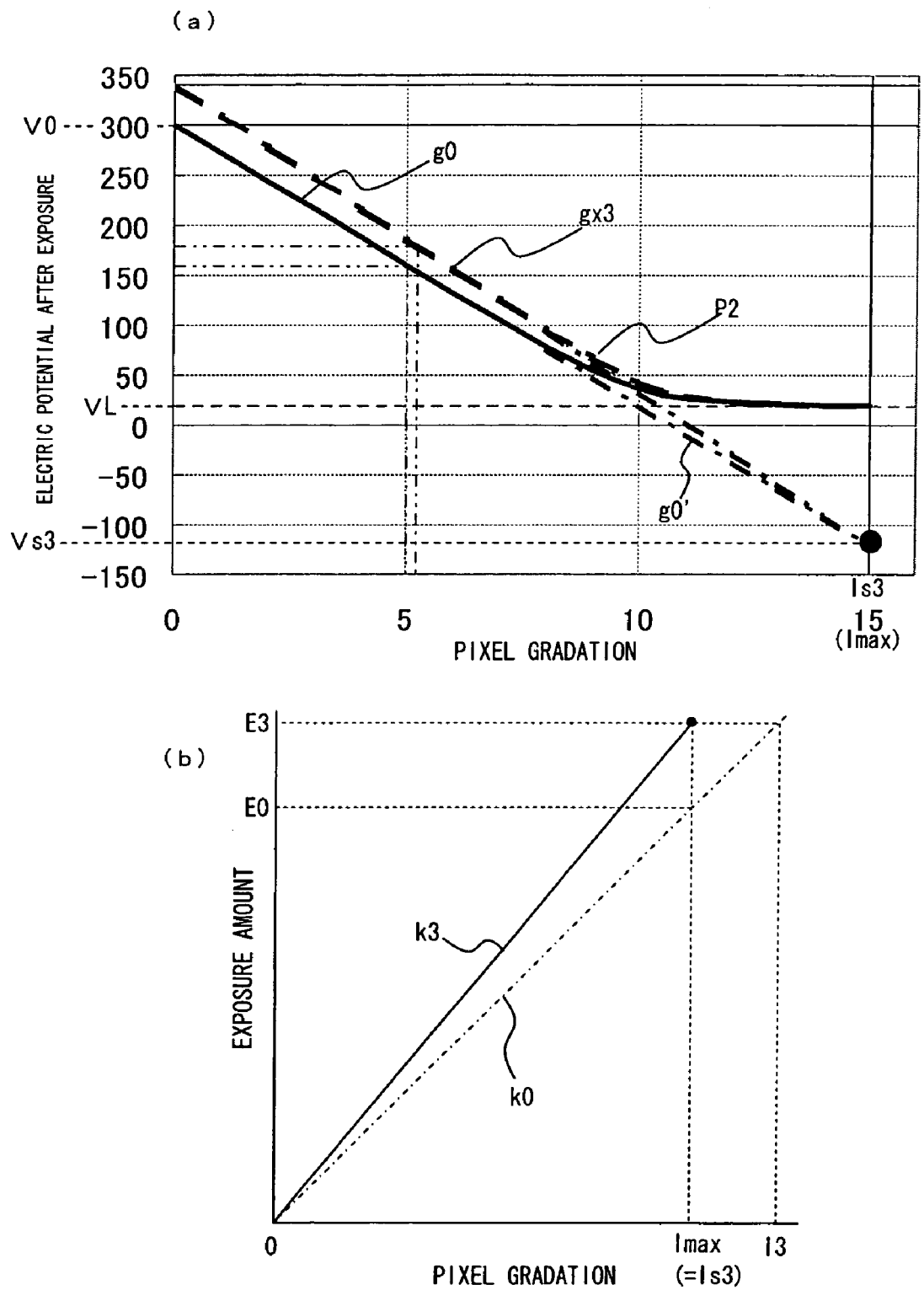
FIGS. 5(a) and 5(b) are graphs according to the third embodiment in image forming apparatus X, showing the transforming property from the pixel gradation into the exposure amount, as well as the relationship between the pixel gradation and the electric potential after exposure at that time.

As the properties in FIG. 3 to FIG. 5 suggest, the smaller the reference pixel gradation is (in short, the larger the reference electric potential is, or the closer to the initial electric potential the reference electric potential is), the larger the slope showing the change in the exposure amount against the change in the pixel gradation becomes, when the individual exposure amount transformation is conducted by utilizing the slope information based upon the reference pixel gradation and the reference electric potential thereof. This means, the adjustment intending to bring the electric potential after electrification to the pixel gradation close to the reference property (graph g1 in FIG. 6(a)) becomes large.

Figure 9:
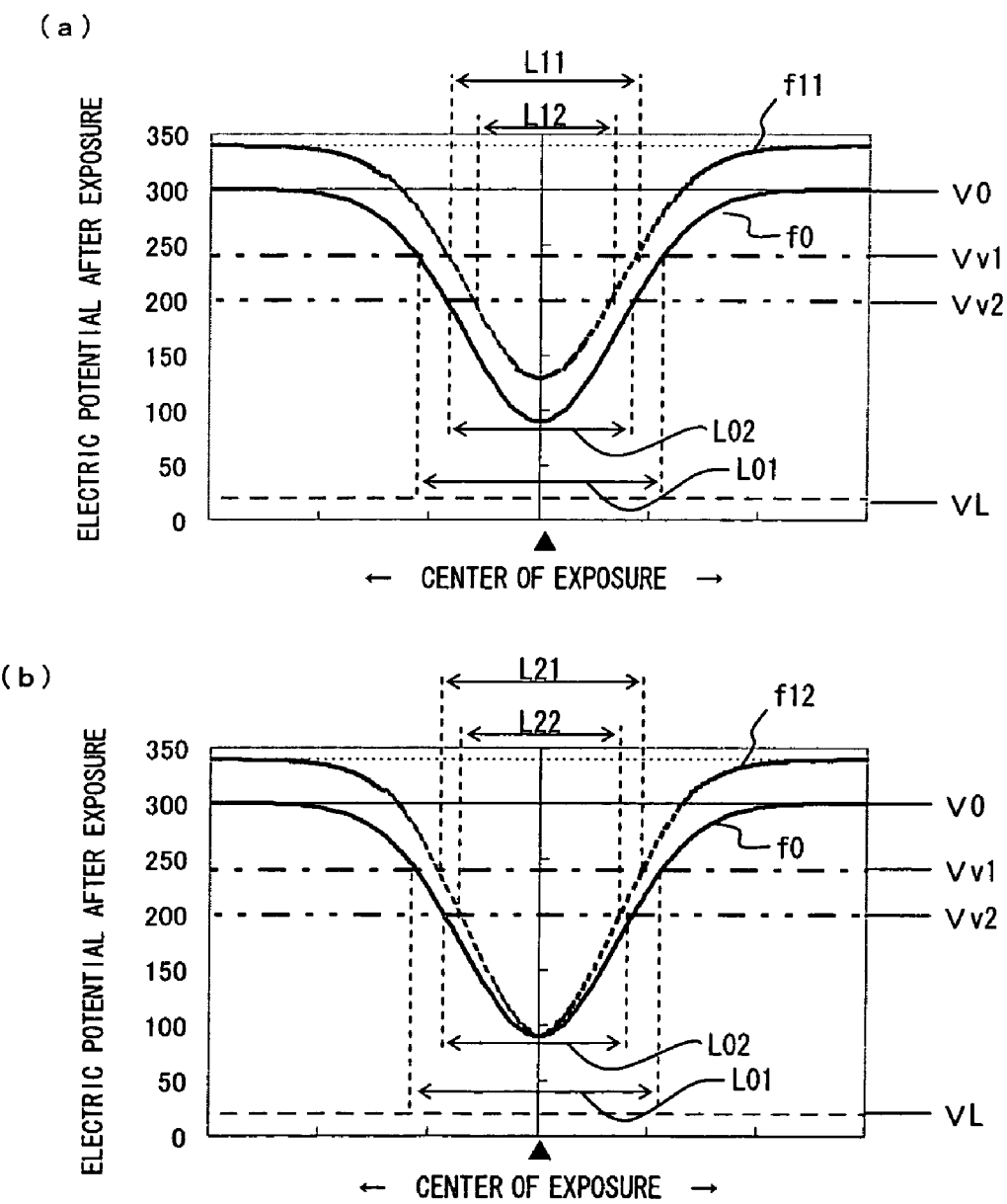
FIG. 9 shows the relationship between the developing bias potential and the electric potential of the photoreceptor drum after exposure.

Referring now to FIG. 9, the relationship between developing bias potential and electric potential after exposure on photoreceptor drum 1 in developing apparatus 5 is described.

FIG. 9 shows a graph indicating the electric potential distribution after exposure from an exposing center to the prescribed range, of when a certain position on the surface of electric-charged photoreceptor drum 1 is exposed with the prescribed exposure amount. The vertical axis shows the electric potential after exposure, while the horizontal axis shows the position in the across-the-width direction to the center of exposure (the center of the image).

Also, FIG. 9(a) shows an electric potential distribution f0 after exposure on a reference position Pa that has a reference (ideal) exposure property of when exposed with a exposure amount Ea, as well as an electric potential distribution f11 after exposure on a position Pb that has uneven electrification.

On the other hand, FIG. 9(b) shows an electric potential distribution after exposure with exposure amount Ea on reference position Pa, as well as an electric potential distribution f12 after exposure with an exposure amount Eb that is larger than exposure amount Ea on position Pb.

As indicated in FIG. 9(a), when a position is exposed, the electric potential after exposure has a largest decrease at the center of exposure, while increasing gradually along the prescribed curve as far as from it.

When the level of developing bias potential (the level of DC component) is Vv1, since dot (drawing image (toner image)) is formed within the range having less than or equal to electric potential Vv1, the dot width at reference position Pa is L01 and is L11 at position Pb in FIG. 9(a). When the level of developing bias potential is decreased to Vv2, the dot width at reference position Pa narrows to L02, while at position Pb, narrows to L12. When initial electric potential and sensitivity on the surface of photoreceptor drum 1 are uniform, as much as the exposure amount is same, the dot width at each position becomes uniform.

When there are differences (uneven electrification) between initial electric potentials according to positions, as indicated in FIG. 9(a), there appear gaps between dot widths in respective positions (L01-L11) or (L02-L12). Such gaps in dot widths cause uneven density in images.

As shown in FIG. 9(b), when the exposure amount is adjusted, so the gap between dot widths narrows, however, with the different levels in developing bias potentials, the gap between dot widths makes different change even with the same adjustment in the exposure amount.

For example, in FIG. 9(b), when developing bias potential is Vv1, the ratio of dot width between position Pb against reference position Pa is (L21/L01), and the same ratio of when developing bias potential is Vv2 is (L22/L01), and therefore (L22/L02)<(L21/L01). This indicates that, in order to amend equally likely the gap between dot widths, the adjustment in exposure amount must become larger as developing bias potential becomes higher.

The above case can be applied when conditions of both frequency and VPP in AC component in developing bias potential are different.

For example, when frequency is higher or VPP is larger in AC component in developing bias potential, uneven density in images caused by uneven electric potential in photoreceptor is easily distinguished, hence the adjustment intending to bring the electric potential after exposure to the photoreceptor much closer to a target (reference) electric potential has to be made (larger adjustment has to be made).

Such developing conditions can be altered according to situations or apparatuses by means of various controls or initial adjustment of the image forming apparatus.

Additionally, since uneven density in images caused by uneven electric potential in photoreceptor is easily distinguished, the adjustment intending to bring the electric potential after exposure to the photoreceptor much closer to a target (reference) electric potential has to be made (larger adjustment has to be made), when the toner density in two-component developer is high, when the stirring time of developer by stirring means such as stirring roller in developing apparatus 5 is short (in short, the electrification amount is small), when the accumulated using time of developer is long, or when atmosphere temperature (environmental temperature) and humidity are high.

In regard to image forming apparatus X according to the embodiment of the second invention, a plurality of candidates for the slope information (one example of the individual transformation information), which is employed for transforming the pixel gradation into exposure amount, is memorized in data memory unit 13 per segments multi-divided the surface of photoreceptor drum 1 (one example of memory means for individual transformation information).

Further, control member 10 detects conditions related to development except for the exposure amount of exposing source 2 (exposing means) and environmental conditions, and then, based upon the detecting result, the slope information to be employed is selected from the plural candidates for the slope information (one example of selecting means for individual transformation information). Then, by employing the selected slope information, the pixel gradation is individually transformed into the exposure amount per segment (one example of means of individual exposure amount transformation).

For example, for each of the segments, with setting multiple of phases (n phases) from small pixel gradation to large pixel gradation in the reference pixel gradation, the slope information ki (I=1 to n) corresponding each of such phases are calculated, and then the result is memorized in data memory unit 13 as the candidates for the slope information. Hereinafter, the candidates for the reference pixel gradation is Is1 (I=1 to n).

In addition, in regard to each of followings: level of DC component in developing bias potential, frequency of AC component in developing bias potential, VPP of AC component in developing bias potential, toner density in two-component developer, stirring time of developer, accumulated using time of developer, each condition in environmental temperature and environmental humidity (hereinafter referred to as "selecting conditions of slope information"), the corresponding information for selecting slope information, which represents the corresponding relationship between scope dividing information for dividing those values into a plurality of scopes (for example, thresholds) and the candidates ki for the slope information suitable for the case when each value of the selecting conditions of slope information is within each scope, is also memorized in data memory unit 13.

On the other hand, before starting image forming processing, control member 10 detects each value of the selecting conditions of slope information (including obtaining the result detected by other detecting means), and at the same time, selects the candidates k1 for the slope information corresponding to (suitable for) each of the selecting conditions of slope information based upon the detecting result and the scope dividing information.

From the candidates k1 for the slope information selected in the above manner, for example, the slope information ki based upon the minimum reference pixel gradation Isi (in short, ki with the largest adjustment) is selected, and with use of such ki, the individual exposure amount transformation of the image data of image forming target is conducted. And then, according to the exposure amount as the result of the aforesaid individual exposure amount transformation, each segment on photoreceptor drum 1 is exposed by exposing source 2.

This enables selection of the appropriate slope information in response to changes in conditions of development and environment, thereby preventing the occurrence of uneven density in images.

Other selecting processing of the slope information can be employed. For example, it is contemplated that, for each of the selecting conditions of slope information, a membership function for fuzzy inference (output is pixel gradation) is previously memorized in data memory unit 13, and control member 10 decides a pixel gradation by conducting the known fuzzy inference processing using the membership function. Then the slope information ki calculated based upon the reference pixel gradation Isi closest to the above-decided pixel gradation, is selected. This enables a selecting of the slope information (individual transformation information) wherein the balance between each of selecting conditions of slope information is considered.

The level of DC component in developing bias potential, frequency of AC component in developing bias potential, and VPP of AC component in developing bias potential are detected by developing bias adjuster 15, its result being transferred to control member 10.

Also, the toner density in two-component developer is detected by a toner density sensor placed in developing apparatus 5, its result being transferred to control member 10.

Stirring time and accumulated using time of developer are detected by measuring the controlled operating time of developing apparatus 5 set by control member 10 by an internal clock/timer. In regard to accumulated using time of developer, the sequentially added operating time of developing apparatus 5 is memorized in data memory unit 13, and when the prescribed reset operation from display operation member 11 associated with developer replacement is detected, its accumulated time is reset.

Either environmental temperature (atmosphere temperature) or environmental humidity (atmosphere humidity) are detected by thermohygrometer 16, its result being transferred to control member 10.

In the above-mentioned embodiments and examples according to the first and second inventions, the segment involves segments that multi-divided the surface of photoreceptor drum 1 either in axial direction or circumferential direction, though not intending to limit the scope.

For example, when uneven electrification and uneven sensitivity in one of axial direction or circumferential direction of photoreceptor drum 1 is primarily concerned, the segment may involve segments that multi-divided the surface of photoreceptor drum 1 only in axial direction (the segment dividing photoreceptor drum 1 in cross-sectional manner), or segments that multi-divided the surface of photoreceptor drum 1 only in circumferential direction.

Additionally, in the embodiments and examples, though the slope itself of when the pixel gradation is transformed into the exposure amount is indicated as an example of the slope information, other information that can specify the slope can be applied. For example, such as the transformation table from the pixel gradation to the exposure amount, and the coordinate information specifying the slope of coordinate system comprising the axis of the pixel gradation and of the exposure amount, can be memorized in data memory unit 13 as the slope information.

As described above, when reference pixel gradation Is is pixel gradation Is1 that is in the range of the approximately-linear exposure property, the reference electric potential is determined as follows.

An exposure amount is obtained by transforming reference pixel gradation Is1 according to the reference individual exposure amount transformation property (dashed line graph $E=k0 \cdot I$ in FIG. 3($b$)), and then, the above exposure amount is applied to the reference (ideal) exposure property of the photoreceptor drum (graph g0 in FIG. 6($a$)) so that electric potential Vs1 after exposure is obtained, and consequently, said electric potential Vs1 is determined as a reference electric potential.

The slope information k1 is an information (slope k1 shown in FIG. 3($b$)) which, with the reference electric potential Vs1 (the electric potential at the midpoint between an initial electric potential E0 and a residual potential EL), matches (or nearly matching under limitation such as resolution) the electric potential after exposure, of when the exposure amount E1 obtained by transforming the reference pixel gradation Is1 by the individual exposure amount transformation, is applied to the exposure property in respective segments (the property in graph g01 in FIG. 6($a$)).

Also, when the pixel gradation Is is the pixel gradation Is3 that corresponds to the property existing in the range crossing over the range of the approximately-linear exposure property, the reference electric potential is an electric potential Vs3 after exposure of when the exposure amount, obtained by transforming the reference pixel gradation Is3 by the reference transformation formula ($E=k0 \cdot I$), is applied to the property which the approximately-linear exposure property as a part of the reference (ideal) exposure property of the photoreceptor drum (graph g0 in FIG. 6($a$)) is extended by extrapolation operation (the imaginary property as indicated in dash line g0' in FIG. 6($a$)).

In addition, the slope information k3 is an information (slope k3 shown in FIG. 5($b$)) for matching (or nearly matching under limitation such as resolution) the electric potential after exposure, of when the exposure amount E3 obtained by transforming the reference pixel gradation Is3 by the individual exposure amount transformation, is applied to the exposure property, which the approximately-linear exposure property in each of the segments is extended by extrapolation operation (shown as g01' in FIG. 6($a$)), with the reference electric potential Vs3 (the imaginary electric potential calculated by extrapolation operation).

[The Third Invention]

In what follows, the decision rule of reference pixel gradation Is (Is1 or Is3) is described. And the reference electric potential (Vs1 and Vs3 in the above) set based upon reference pixel gradation Is is hereinafter referred to as Vs.

As reference pixel gradation Is, which is one of elements specifying slope information k1 set (memorized) in image forming apparatus X, the average value of the pixel gradation in a part of the pixel unit group or all of the pixel, which to be determined when image formation is conducted based upon the prescribed one or a plurality of image data (such as image data of reading manuscript and printing jobs) by image processing unit 12 performing image formation of area coverage modulation method, is set.

In what follows, more concrete embodiments of the decision rule of reference pixel gradation Is are described.

The First Embodiment of Decision Rule of Reference Pixel Gradation

Referring now to FIG. 10, the first embodiment of decision rule of reference pixel gradation Is is explained.

The first embodiment is an example for deciding, as reference pixel gradation Is, the average value of the pixel gradations of all pixels in the unit pixel group determined by image processing unit 12 based upon the prescribed image data.

FIG. 10 shows an array of the pixel gradations in a unit pixel group (in the example of FIG. 10, a pixel group comprising 10 pixels×10 pixels) determined by performing an image processing by image processing unit 12 in two-value error diffusion method (one example of area coverage modulation methods) based upon an image data of 40% density gradation. Each square represents each pixel, while numbers in each square represent the value of the pixel gradation (0 to 15) in FIG. 10.

As shown in FIG. 10, the ratio of drawing pixels (wherein the pixel gradation is not 0 (but 15)) to all pixels (100 pixels) in the unit pixel group is 40%, thereby forming an image of 40% density gradation.

In accordance with the above unit pixel group, when the average pixel gradation of all pixels are calculated, (0×60+15×40)/100=6 (gradation). Therefore, under the decision rule of the first embodiment, reference pixel gradation Is is "6", when an image data (data having 40% image density gradation) wherein such as the unit pixel group indicated in FIG. 10 can be decided by image processing unit 12 is provided. Also, when the above reference pixel gradation "6" is applied to the reference exposure property g0 shown in FIG. 6(*a*), the electric potential after exposure is approximately 132 (V), which is now regarded as reference electric potential Vs.

The Second Embodiment of Decision Rule of Reference Pixel Gradation

Referring now to FIG. 11, the second embodiment of decision rule of reference pixel gradation Is is explained.

The second embodiment is an example for deciding, as reference pixel gradation Is, the average value of the pixel gradations of all pixels but not pixels with 0 level gradation (in short, the pixel gradation of drawing pixels) in the unit pixel group determined by image processing unit 12 based upon the prescribed image data.

FIG. 11 shows an array of the pixel gradations in a unit pixel group (in the example of FIG. 11, a pixel group comprising 10 pixels×10 pixels) determined by performing an image processing by image processing unit 12 in multi-level screen method (one example of area coverage modulation methods) based upon an image data of approximately 35% density gradation. Each square represents each pixel, while numbers in each square represent the value of the pixel gradation in FIG. 10. The blank squares means 0 level gradation.

As shown in FIG. 11, among all pixels (100 pixels) in the unit pixel group, drawing pixels (wherein the pixel gradation is not 0) are 40 pixels, and among those drawing pixels, the pixels with pixel gradation 15 are 30 pixels, and at the same time, the pixels with pixel gradation 7 are 10 pixels.

In accordance with the above unit pixel group, when the average pixel gradation of all drawing pixels are calculated, (15×30+7×10)/40=13 (gradation). Therefore, under the decision rule of the second embodiment, reference pixel gradation Is becomes 13, when an image data (data having approximately 35% image density gradation) wherein such as the unit pixel group indicated in FIG. 11 can be decided by image processing unit 12, is provided.

If the above noted reference pixel gradation Is as well as reference electric potential Vs corresponding thereto, that are determined based upon the decision rules according to the first and second embodiments, is utilized, reference pixel gradation Is, with which the electric potentials after exposure become the same in any of the segments (matching with reference electric potential Vs), is the average value of the pixel gradation of pixels in the unit pixel group actually determined by image processing unit 12, and therefore, the individual exposure amount transformation in accordance with the actual property of output images (the average pixel gradation) can be achieved.

For example, when the average value of the pixel gradation in the unit pixel group of when the image data with frequently-used density gradation is processed by image processing unit 12, is set as reference pixel gradation Is, the equalization of electric potential after exposure to, particularly, the image data with frequently-used density gradation is achieved, thereby preventing effectively the occurrence of uneven density.

In addition, even when the image processing performed by image processing unit 12 (such as, methods of area coverage modulation and array pattern of pixels in screen method) differ on the conditions of such as apparatus models and image processing modes (such as, character/graphic mode and photo mode), the slope information suitable for each condition can be decided.

The Third Embodiment of Decision Rule of Reference Pixel Gradation

Figure 12:
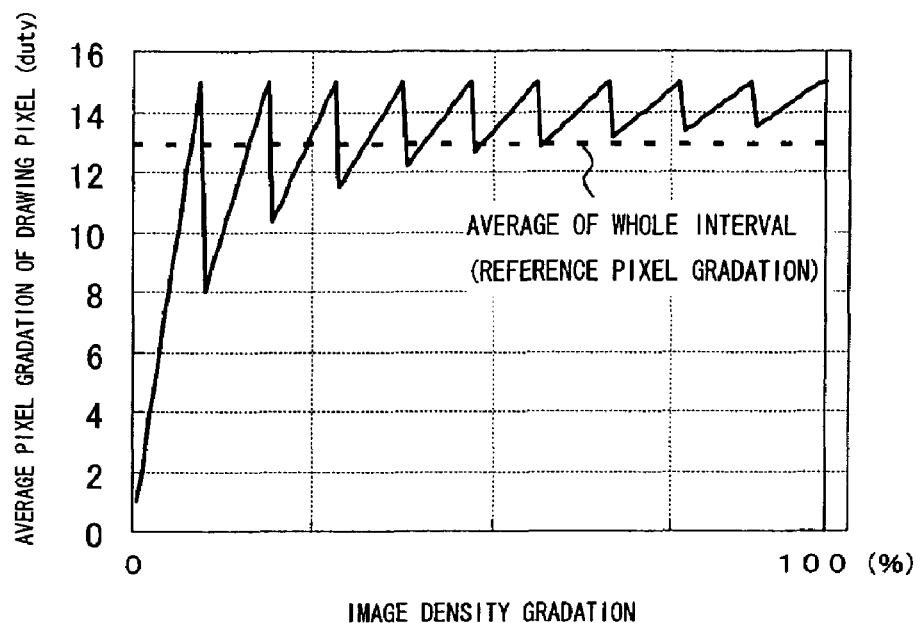
FIG. 12 shows the third example of the decision rule of the reference gradation according to image forming apparatus X.

Referring now to FIG. 12, the third embodiment of decision rule of reference pixel gradation Is is explained.

In the third embodiment, basically similar to the second embodiment, the average value of pixel gradations of drawing pixels in the unit pixel group is set as reference pixel gradation Is. However, in this embodiment, the average value of pixel gradations of drawing pixels (pixels having pixel gradation of more than 0 level gradation) in a plurality of the unit pixel groups is set as reference pixel gradation Is.

FIG. 12 shows a graph indicating the average value of pixel gradations of every drawing pixel in each of the unit pixel groups, which respectively represent all of the density gradations (0.7% to 100.0%) representable in the area coverage modulation method employed by image processing unit 12 (herein after referred to as the "average pixel gradation").

In FIG. 12, the sections, wherein the average pixel gradation is drastically variable in a teeth-of-a-saw manner, are where changes occur in figures of drawing pixels according to the change in the representing gradation density.

Additionally, the level represented in a dashed line in FIG. 12 is the average value of the average pixel gradation corresponding to density gradation in all range, and set as reference pixel gradation Is in the third embodiment.

More specifically in the third embodiment, in regard to a plurality of the unit pixel groups (those to be determined by image processing unit 12) respectively representing all of the density gradations (density gradations in a total range), which can be represented in the area coverage modulation method employed by image processing unit 12, the average value of the pixel gradations of all drawing pixels (pixels having more than 0 level gradation) included in above unit pixel group respectively is set as reference pixel gradation Is.

According to the above, in regard to the pixel gradations of average level among the image data having various density gradations, equalization of electric potential after exposure, in other words, prevention of uneven density in images can be achieved.

The Forth Embodiment of Decision Rule of Reference Pixel Gradation

Figure 13:
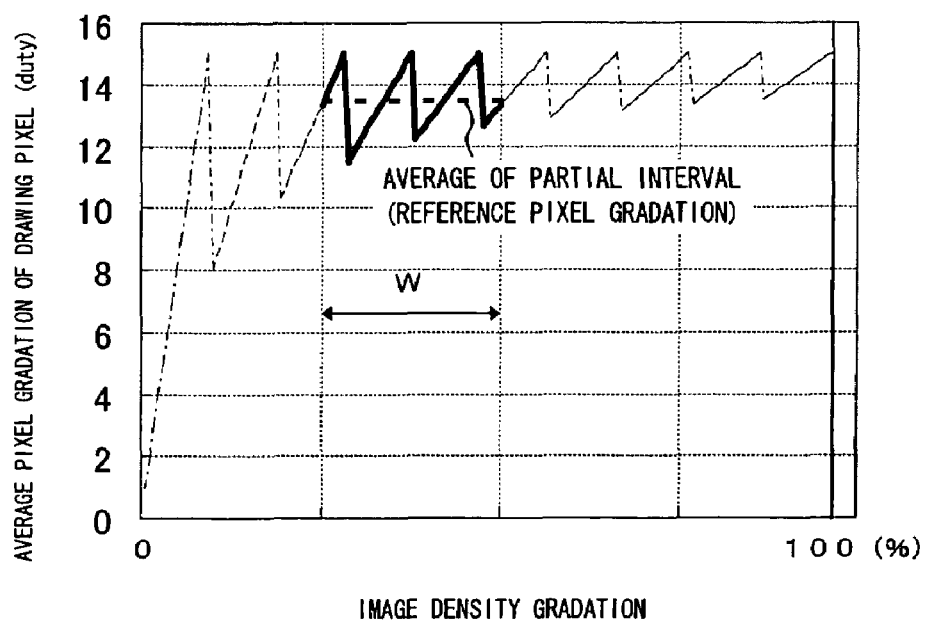
FIG. 13 shows the forth example of the decision rule of the reference gradation according to image forming apparatus X.

Referring now to FIG. 13, the forth embodiment of decision rule of reference pixel gradation Is is explained.

In the forth embodiment, similar to the third embodiment, the average pixel gradation in a plurality of the unit pixel groups (the average value of pixel gradations of drawing pixels) is set as reference pixel gradation Is. However, in the forth embodiment, the average value of the average pixel gradations in a partial range (not a total range) of image density gradations is referred to as reference pixel gradation Is.

The graph indicated in a full thick line in FIG. 13 represents a graph of the average pixel gradation in the respective unit pixel groups representing each density gradation in a partial range W, among all of the density gradations (0.7% to 100.0%) that can be represented by the area coverage modulation method employed by image processing unit 12.

Additionally, the level represented in a dashed line in FIG. 13 is the average value of the average pixel gradations (the average value in a section) in relation to density gradations in a partial range W, and set as reference pixel gradation Is in the forth embodiment.

More specifically in the forth embodiment, in regard to a plurality of the unit pixel groups (those to be determined by image processing unit 12) respectively representing a part of the density gradations (density gradations in a partial range), which can be represented in the area coverage modulation method employed by image processing unit 12, the average value of the pixel gradations of all drawing pixels (pixels having more than 0 level gradation) included in above unit pixel group respectively is set as reference pixel gradation Is.

According to the above, in the image data having various density gradations, for example, in regard to the pixel gradations of the level corresponding to the range of frequently-used density gradations, equalization of electric potential after exposure, in other words, prevention of uneven density in images can be achieved.

What is claimed is:

1. An image forming apparatus, comprising an image processing means for determining a pixel gradation indicating gray level in each pixel based upon a prescribed image data, and an exposing means for writing an electrostatic latent image onto a photoreceptor by exposing a surface of said photoreceptor previously electrified by an electrification means with an exposure amount obtained by transforming said pixel gradation determined by said image processing means, said image forming apparatus further comprising;

an individual slope information memory means for individually memorizing said slope information that defines a slope of when said pixel gradation is approximately linear-transformed into said exposure amount within a partial or whole range of said pixel gradation for each segment multi-divided a surface of said photoreceptor, and a means of individual exposure amount transformation for individually transforming said pixel gradation into said exposure amount for each of said segments based upon said slope information, wherein said slope information is an information which, with a reference electric potential that is common between all of said segments, approximately matches an electric potential after exposure of when an exposure amount, obtained by transforming a reference pixel gradation that is common between all of said segments by said means for individual exposure amount transformation, is applied, to an approximately-linear exposure property excepting a converging region to a residual potential, or to a exposure property extending said approximately-linear exposure property by extrapolation operation of above approximately linear exposure property, among exposure properties showing correspondences between exposure amounts and electric potentials after exposure in each of said segments.

2. An image forming apparatus according to claim 1, wherein said slope information is an information which, with said reference electric potential that is an electric potential at the approximately midpoint between an initial electric potential and a residual potential, approximately matches said electric potential after exposure of when an exposure amount, obtained by transforming said reference pixel gradation as utilizing said means of individual exposure amount transformation, is applied to approximately-linear exposure property in each of said segments.

3. An image forming apparatus according to claim 1, wherein said slope information is an information which, with a minimum electric potential in said approximately-linear exposure property, or with said reference electric potential that is an electric potential close to said minimum electric potential, approximately matches said electric potential after exposure of when an exposure amount, obtained by transforming said reference pixel gradation as utilizing said means of individual exposure amount transformation, is applied to approximately-linear exposure property in each of said segments.

4. An image forming apparatus according to claim 1, wherein said slope information is an information which, with said reference electric potential, approximately matches said electric potential after exposure of when an exposure amount, obtained by transforming said reference pixel gradation that is maximum of said pixel gradation or close to said maximum of said pixel gradation as utilizing said means of individual exposure amount transformation, is applied to an exposure property extending said approximately-linear exposure property in each of said segments by extrapolation operation.

5. An image forming apparatus according to claim 1, wherein said image processing means is for conducting gradation representation in an area coverage modulation method that determines an arrangement of said pixel gradation in a plurality of pixels based upon said image data.

6. An image forming apparatus, comprising an image processing means for determining a arrangement of pixel gradations that indicate gray levels in each pixel for every unit pixel group forming a plurality of pixels by an area coverage modulation method based upon a prescribed image data, and an exposing means for writing an electrostatic latent image onto a photoreceptor by exposing a surface of said photoreceptor previously electrified by an electrification means with an exposure amount obtained by transforming said pixel gradation determined by said image processing means, said image forming apparatus further comprising;

an memory means for individual slope information for individually memorizing said slope information that defines a slope of when said pixel gradation is approximately linear-transformed into said exposure amount within a partial or whole range of said pixel gradation for each segment multi-divided a surface of said photoreceptor, and a means of individual exposure amount transformation for individually transforming said pixel gradation into said exposure amount for each of said segments based upon said slope information, wherein said slope information is an information which, with a reference electric potential that is common between all of said segments, approximately matches an electric potential after exposure of when an exposure amount, obtained by transforming a reference pixel gradation that is an approximate average value of said pixel gradations in a partial or whole pixels of said unit pixel group determined based upon one or multiple prescribed image data by said image processing means as utilizing said means of individual exposure amount transformation, is applied, to an approximately-linear exposure property excepting a converging region to a residual potential, or to a exposure property extending said approximately-linear exposure property by extrapolation operation, among exposure properties showing correspondences between exposure amounts and electric potentials after exposure in each of said segments.

7. An image forming apparatus according to claim 6, wherein said reference pixel gradation is an approximate average value of all but zero pixel gradations in said unit pixel group determined by said image processing means based upon one or a plurality of prescribed image data.

8. An image forming apparatus according to claim 7, wherein said reference pixel gradation is, among said pixel gradations in said unit pixel groups determined by said image processing means, an approximate average value of all but zero pixel gradations in a plurality of said unit pixel groups representing each density gradation in a partial or whole range of all density gradations which can be represented by an area coverage modulation method employed by said image processing means.

9. An image forming apparatus according to claim 6, wherein an area coverage modulation method employed by said image processing means includes a screen method, error diffusion method, or a method employing either of said methods.

10. An image forming apparatus according to claim 6, comprising a slope information selecting means for selecting said slope information to be employed by said means of individual exposure amount transformation from a plurality of said slope information in each of said segments based upon one or plurality of followings:

a category of an area coverage modulation method employed by said image processing means;

a toner color employed in development of said electrostatic lament image;

said pixel gradation to be determined based upon a target image data for an image formation ahead by said image processing means;

a history of said pixel gradation determined by said image processing means when an image formation was performed by present image forming apparatus in past times; and an operating input via a prescribed operating input means.

11. An image forming apparatus, comprising an image processing means for determining pixel gradations indicating gray levels in each pixel based upon a prescribed image data, and an exposing means for writing an electrostatic latent image onto a photoreceptor by exposing a surface of said photoreceptor previously electrified by an electrification means with an exposure amount obtained by transforming said pixel gradation determined by said image processing means, said image forming apparatus further comprising:

a memory means for individual transformation information for memorizing a plurality of candidates for individual transformation information employed in order to transform said pixel gradation into said exposure amount for each segment multi-divided a surface of said photoreceptor;

a selecting means for individual transformation information for selecting a said individual transformation information to be employed from a plurality of said candidates for individual transformation information based upon a condition related to development except for an exposure amount by said exposing means and/or an environmental condition; and a means of individual exposure amount transformation for individually transforming said pixel gradation into said exposure amount in each of the segments based upon said individual transformation information selected by said selecting means for individual transformation information, said individual transformation information being an information which defines a slope of when said pixel gradation is approximately linear-transformed into said exposure amount in a partial or whole range of said pixel gradation for each of said segments multi-divided a surface of said photoreceptor, and furthermore, with a reference electric potential that is common between all of said segments, said individual transformation information approximately matching an electric potential after exposure of when an exposure amount, obtained by transforming a reference pixel gradation that is common between all of said segments by said individual exposure amount transformation, is applied, to an approximately-linear exposure property excepting a converging region to a residual potential, or to an exposure property extending said approximately-linear exposure property by extrapolation operation, among exposure properties showing correspondences between an exposure amount and an electric potential after exposure in each of said segment.

12. An image forming apparatus according to claim 1, wherein said segment is a segment that divides a surface of drum-shaped photoreceptor into a plurality in an axial direction, in a circumference direction, or in either of said directions.

13. An image forming apparatus according to claim 1, wherein said photoreceptor is an s-Si photoreceptor.

* * * * *